United States Patent
Ning et al.

(10) Patent No.: US 12,166,646 B2
(45) Date of Patent: Dec. 10, 2024

(54) METHOD AND APPARATUS FOR DISPLAYING USER INTERFACE USED TO MANAGE STORAGE DEVICE

(71) Applicant: Huawei Technologies Co., Ltd., Shenzhen (CN)

(72) Inventors: Shangming Ning, Chengdu (CN); Chenbo Li, Chengdu (CN); Chenxu Tian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/993,356

(22) Filed: Nov. 23, 2022

(65) Prior Publication Data

US 2023/0078482 A1 Mar. 16, 2023

Related U.S. Application Data

(63) Continuation of application No. PCT/CN2021/094029, filed on May 17, 2021.

(30) Foreign Application Priority Data

May 25, 2020 (CN) .......................... 202010450306.2

(51) Int. Cl.
*H04L 41/22* (2022.01)
*G06F 3/0484* (2022.01)
*G06N 20/20* (2019.01)

(52) U.S. Cl.
CPC ............ *H04L 41/22* (2013.01); *G06F 3/0484* (2013.01); *G06N 20/20* (2019.01)

(58) Field of Classification Search
CPC ........ G06Q 10/02; G06Q 50/12; H04L 41/22; H04L 67/10; G06F 3/0484; G06F 9/5066; G06F 19/3475; G06F 3/0482; G06F 3/0488; G06N 5/025; G06N 20/00; G09B 5/00
See application file for complete search history.

(56) References Cited

U.S. PATENT DOCUMENTS

| | | | | |
|---|---|---|---|---|
| 9,641,388 | B2 * | 5/2017 | Kripalani | G06F 8/61 |
| 2013/0332208 | A1 * | 12/2013 | Mehta | G06Q 10/02 |
| | | | | 705/5 |
| 2015/0215398 | A1 * | 7/2015 | Chang | H04L 63/083 |
| | | | | 726/8 |
| 2015/0379426 | A1 * | 12/2015 | Steele | G06N 5/025 |
| | | | | 706/12 |

(Continued)

FOREIGN PATENT DOCUMENTS

| | | | | |
|---|---|---|---|---|
| AU | 2007297673 B2 * | 4/2011 | ......... | G06F 19/3475 |
| AU | 2012316730 A1 * | 4/2014 | ............ | G06F 21/32 |

(Continued)

*Primary Examiner* — Steven P Sax
(74) *Attorney, Agent, or Firm* — Slater Matsil, LLP

(57) ABSTRACT

A method for displaying a user interface used to manage a storage device is provided. The method is performed by a management device managing the storage device, and the method includes: obtaining, by using configuration content displayed in a first user interface, configuration data of a storage device configured for a first user; and after the first user logs in to the management device, displaying a second user interface corresponding to the first user, where the second user interface displays display content determined based on the configuration data.

9 Claims, 13 Drawing Sheets

(56) References Cited

U.S. PATENT DOCUMENTS

| | | | | |
|---|---|---|---|---|
| 2015/0379428 A1* | 12/2015 | Dirac | ............... | G06N 20/00 706/12 |
| 2015/0379429 A1* | 12/2015 | Lee | ............... | G09B 5/00 706/11 |
| 2015/0379430 A1* | 12/2015 | Dirac | ............... | G06N 20/00 706/12 |
| 2016/0078361 A1* | 3/2016 | Brueckner | ............... | H04L 67/10 706/12 |
| 2016/0350470 A1* | 12/2016 | Pinello | ............... | G06F 30/398 |
| 2018/0113623 A1* | 4/2018 | Sancheti | ............... | G06F 11/1451 |

FOREIGN PATENT DOCUMENTS

| | | | | | |
|---|---|---|---|---|---|
| AU | 2014212163 | A1 | * | 8/2015 | ......... G06F 11/1453 |
| CA | 2574883 | A1 | * | 1/2006 | |
| CA | 2585128 | A1 | * | 5/2006 | |
| CA | 2653299 | A1 | * | 8/2009 | |
| CA | 2839121 | A1 | * | 1/2013 | ............. G06F 16/20 |
| CA | 3025201 | A1 | * | 5/2019 | ......... G07F 17/3206 |
| CA | 3065705 | A1 | * | 6/2020 | ............. G06F 16/45 |
| CA | 3125634 | A1 | * | 7/2020 | ............. G06F 3/0482 |
| CA | 3082897 | C | * | 5/2023 | ............. A61B 5/002 |
| CN | 1713575 | A | * | 12/2005 | |
| CN | 202424769 | U | * | 9/2012 | |
| CN | 105763851 | A | * | 7/2016 | |
| EP | 1540862 | B1 | * | 3/2014 | ....... G06F 17/30884 |
| FR | 2990036 | A1 | * | 11/2013 | ............. G06F 1/187 |
| JP | 2004192134 | A | * | 7/2004 | ............. H04L 41/26 |
| JP | 5207112 | B2 | * | 6/2013 | |
| JP | 2021068082 | A | * | 4/2021 | |
| TW | 200926033 | A | * | 6/2009 | |
| TW | 202006578 | A | * | 2/2020 | ......... H04L 41/28 |
| WO | WO-2015044706 | A1 | * | 4/2015 | ......... G06Q 30/0241 |
| WO | WO-2016004075 | A1 | * | 1/2016 | ............. G06F 9/5066 |
| WO | WO-2016210327 | A1 | * | 12/2016 | ......... G06F 21/6218 |
| WO | WO-2018018099 | A1 | * | 2/2018 | ......... G06Q 30/0251 |

* cited by examiner

| Lun group name: | LG_A_01 |
| Lun number: | |

| LUN name: | | Capacity: | |

Submit

FIG. 5

METHOD AND APPARATUS FOR DISPLAYING USER INTERFACE USED TO MANAGE STORAGE DEVICE

CROSS-REFERENCE TO RELATED APPLICATIONS

This application is a continuation of International Application No. PCT/CN2021/094029, filed on May 17, 2021, which claims priority to Chinese Patent Application No. 202010450306.2, filed on May 25, 2020. The disclosures of the aforementioned applications are hereby incorporated by reference in their entireties

TECHNICAL FIELD

This application relates to the field of storage technologies, and specifically, to a method and an apparatus for displaying a user interface used to manage a storage device.

BACKGROUND

In a cloud computing era, massive data needs to be stored by using one or more storage devices. Usually, a user uses or manages a storage device by logging in to management software. As features of a storage product increase, the management software is more complex, and learning and time costs of using the management software by the user also gradually increase. Specifically, during design of the management software, all involved configuration items are usually fixed in a menu bar, and an input box in the menu bar is empty by default or has a fixed default value. After each time of logging in to the management software, the user needs to search a plurality of multifarious menus for a menu required by the user. Each time the user creates a resource instance, the user needs to manually enter a tedious naming identifier. In addition, each time the user performs parameter configuration on a plurality of configuration items of a resource instance, the user needs to manually enter parameter values. Therefore, a more effective solution for displaying a user interface in storage device management software is required.

SUMMARY

Embodiments of this application are intended to provide a more effective method for displaying a user interface used to manage a storage device, to resolve a disadvantage in the conventional technology.

To achieve the foregoing objective, an aspect of this application provides a method for displaying a user interface used to manage a storage device. The method is performed by a management device managing the storage device, and the method includes: obtaining, by using configuration content displayed in a first user interface, configuration data of a storage device configured for a first user; and after the first user logs in to the management device, displaying a second user interface corresponding to the first user, where the second user interface displays display content determined based on the configuration data.

According to the method for displaying a user interface provided in this embodiment of this application, a user interface is displayed based on historical configuration data of a user, to provide a customized user interface for the user. For example, the user interface displays a common menu of the user, so that the user does not need to search a plurality of tedious menus for a menu required by the user. Alternatively, for example, the user interface displays a recommended instance name or a recommended parameter value, so that the user does not need to manually enter a name or a parameter value. Therefore, a user operand is reduced, and use efficiency of the user for a storage system is improved.

In an implementation, the configuration content is used to configure a first object, and the obtaining, by using configuration content displayed in a first user interface, configuration data of a storage device configured for a first user includes: obtaining the configuration content of the first user interface, and storing the configuration content in historical configuration data of the first object; and the method further includes: performing statistics collection for the first object based on the historical configuration data, to generate statistical information of the first object; and determining, based on the statistical information of the first object, the display content displayed in the second user interface. In this implementation, the historical configuration data of the user is preprocessed in advance, to obtain statistical information of a plurality of configuration items, so that system processing time can be reduced when a user interface is determined in response to a user operation, thereby increasing a system response speed.

In an implementation, the configuration content is a name of an object configured by using the configuration content, and the display content is a default name or a recommended name that is of the object and that is determined based on the configuration content.

In an implementation, the obtaining, by using configuration content displayed in a first user interface, configuration data of a storage device configured for a first user includes: obtaining the name of the object configured by using the configuration content, and storing the name of the object in historical configuration data; and the method further includes: performing statistics collection on the name of the object configured by using the configuration content, to generate statistical information of the name of the object configured by using the configuration content; and determining the default name or the recommended name of the object based on the statistical information of the name of the object configured by using the configuration content. In this implementation, a recommended name is determined based on statistical information of a plurality of names historically entered by the user, so that a computing amount is relatively small and a recommendation effect is relatively good. This is particularly applicable to a scenario in which the management system is locally run on the storage device and therefore a computing resource is limited.

In an implementation, the determining the default name or the recommended name of the object based on the statistical information of the name of the object configured by using the configuration content includes: determining the default name or the recommended name of the object based on the statistical information of the name of the object configured by using the configuration content and current input information of the user. The current input information is, for example, information that is entered by the user and that is associated with the object, and the information may be, for example, a name of a parent object of the object.

In an implementation, the configuration content is a parameter value of an object configured by using the configuration content, and the display content is a default parameter value or a recommended parameter value that is of the object and that is determined based on the configuration content.

In an implementation, the obtaining, by using configuration content displayed in a first user interface, configuration data of a storage device configured for a first user includes: obtaining the parameter value of the object configured by using the configuration content, and storing the parameter value of the object in historical configuration data; and the method further includes: performing statistics collection on the parameter value of the object configured by using the configuration content, to generate statistical information of the parameter value of the object configured by using the configuration content; and determining the default parameter value or the recommended parameter value of the object based on the statistical information of the parameter value of the object configured by using the configuration content. In this implementation, a recommended parameter value is determined based on statistical information of a plurality of parameter values historically entered by the user, so that a computing amount is relatively small and a recommendation effect is relatively good. This is particularly applicable to a scenario in which the management system is locally run on the storage device and therefore a computing resource is limited.

In an implementation, the determining the default parameter value or the recommended parameter value of the object based on the statistical information of the parameter value of the object configured by using the configuration content includes: determining the default parameter value or the recommended parameter value of the object based on the statistical information of the parameter value of the object configured by using the configuration content and current input information of the user. The current input information is, for example, information that is entered by the user and that is associated with the object, and the information may be, for example, a name of a parent object of the object, or a name of an object associated with the object.

In an implementation, the configuration content is a first menu displayed in the first user interface, and the display content is a second menu that is determined based on the configuration content and that is displayed in the second user interface.

In an implementation, the obtaining, by using configuration content displayed in a first user interface, configuration data of a storage device configured for a first user includes: obtaining access information of the first menu, and storing the access information in historical configuration data; and the method further includes: performing statistics collection on historical access frequency of the first menu, to generate statistical information of the historical access frequency of the first menu; and determining, based on the statistical information of the historical access frequency of the first menu, the second menu displayed in the second user interface. In this implementation, at least one menu displayed in a system home page is determined based on frequency of a plurality of menus historically accessed by the user, so that a computing amount is relatively small and a recommendation effect is relatively good. This is particularly applicable to a scenario in which the management system is locally run on the storage device and therefore a computing resource is limited.

In an implementation, the method further includes: after the statistical information of the first object is generated, constructing a statistical information tree of the first user based on the statistical information, where the statistical information tree includes a node corresponding to the first object, and the statistical information of the first object is stored in the node. In this implementation, a user interface is determined based on a configuration item tree of the user, so that memory storage space can be saved, and a query speed can be increased.

Another aspect of this application provides an apparatus for displaying a user interface used to manage a storage device. The apparatus is deployed in a management device managing the storage device, and the apparatus includes: an obtaining unit, configured to obtain, by using configuration content displayed in a first user interface, configuration data of a storage device configured for a first user; and a display unit, configured to: after the first user logs in to the management device, display a second user interface corresponding to the first user, where the second user interface displays display content determined based on the configuration data.

In an implementation, the configuration content is used to configure a first object, and the obtaining unit is further configured to: obtain the configuration content of the first user interface, and store the configuration content in historical configuration data of the first object; and the apparatus further includes: a first generation unit, configured to perform statistics collection for the first object based on the historical configuration data, to generate statistical information of the first object; and a first determining unit, configured to determine, based on the statistical information of the first object, the display content displayed in the second user interface.

In an implementation, the configuration content is a name of an object configured by using the configuration content, and the display content is a default name or a recommended name that is of the object and that is determined based on the configuration content.

In an implementation, the obtaining unit is further configured to: obtain the name of the object configured by using the configuration content, and store the name of the object in historical configuration data; and the apparatus further includes: a second generation unit, configured to perform statistics collection on the name of the object configured by using the configuration content, to generate statistical information of the name of the object configured by using the configuration content; and a second determining unit, configured to determine the default name or the recommended name of the object based on the statistical information of the name of the object configured by using the configuration content.

In an implementation, the configuration content is a parameter value of an object configured by using the configuration content, and the display content is a default parameter value or a recommended parameter value that is of the object and that is determined based on the configuration content.

In an implementation, the obtaining unit is further configured to: obtain the parameter value of the object configured by using the configuration content, and store the parameter value of the object in historical configuration data; and the apparatus further includes: a third generation unit, configured to perform statistics collection on the parameter value of the object configured by using the configuration content, to generate statistical information of the parameter value of the object configured by using the configuration content; and a third determining unit, configured to determine the default parameter value or the recommended parameter value of the object based on the statistical information of the parameter value of the object configured by using the configuration content.

In an implementation, the configuration content is a first menu displayed in the first user interface, and the display content is a second menu that is determined based on the configuration content and that is displayed in the second user interface.

In an implementation, the obtaining unit is further configured to: obtain access information of the first menu, and store the access information in historical configuration data; and the apparatus further includes: a fourth generation unit, configured to perform statistics collection on historical access frequency of the first menu, to generate statistical information of the historical access frequency of the first menu; and a fourth determining unit, configured to determine, based on the statistical information of the historical access frequency of the first menu, the second menu displayed in the second user interface.

In an implementation, the apparatus further includes: a construction unit, configured to: after the statistical information of the first object is generated, construct a statistical information tree of the first user based on the statistical information, where the statistical information tree includes a node corresponding to the first object, and the statistical information of the first object is stored in the node.

Another aspect of this application provides a computer-readable storage medium. A computer program is or instructions are stored in the computer-readable storage medium, and when the computer program is or the instructions are executed in a computer, the computer is enabled to perform any one of the foregoing methods.

Another aspect of this application provides a computing device, including a memory and a processor. A computer program is or instructions are stored in the memory, and the processor is configured to implement any one of the foregoing methods when executing the computer program or the instructions.

BRIEF DESCRIPTION OF THE DRAWINGS

Embodiments of this application are described with reference to accompanying drawings, so that embodiments of this application can be clearer.

FIG. 5 shows a user interface displayed when a user 1 creates a Lun group;

DETAILED DESCRIPTION OF ILLUSTRATIVE EMBODIMENTS

The following describes technical solutions of embodiments of this application with reference to accompanying drawings.

Figure 1:
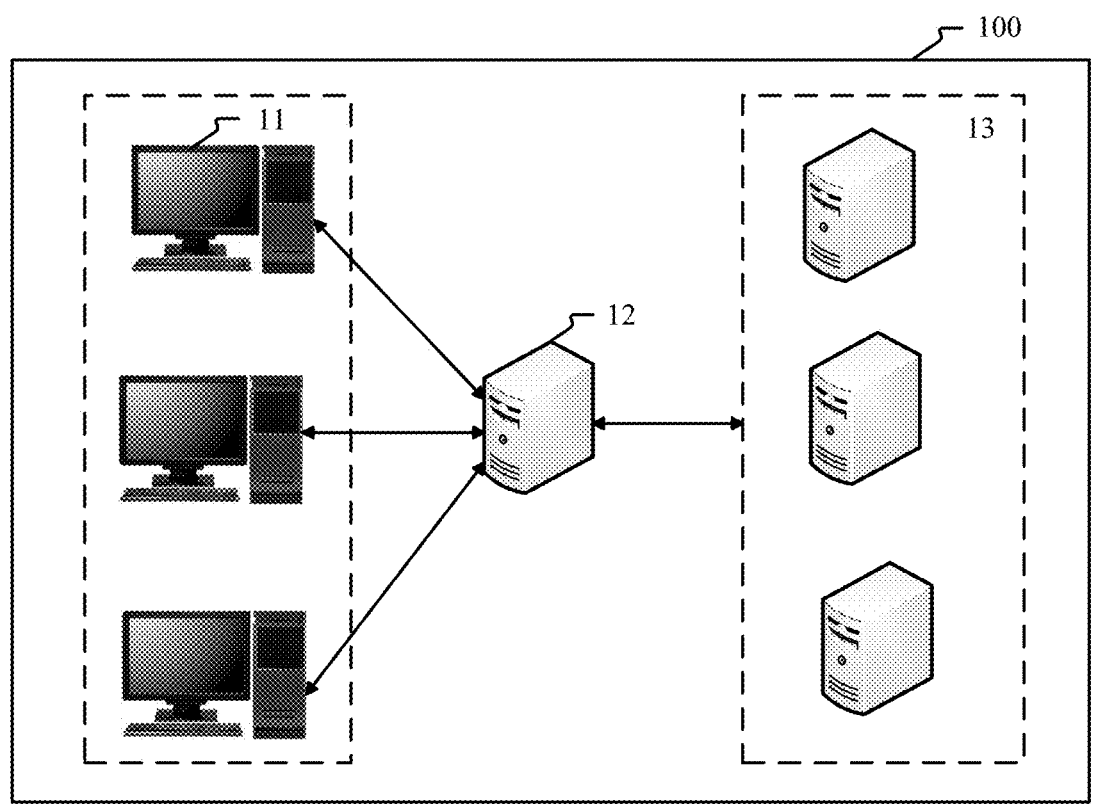
FIG. 1 is a schematic diagram of a storage system 100 according to an embodiment of this application.

FIG. 1 is a schematic diagram of a storage system 100 according to an embodiment of this application. As shown in FIG. 1, the system 100 includes a plurality of user terminals (FIG. 1 schematically shows three user terminals, including a user terminal 11), a management device 12, and a storage device 13. FIG. 1 schematically shows the storage device 13 as a cluster including three devices. The user terminals are connected to the management device 12, and the management device 12 is connected to the storage device 13. To ensure privacy of data in the storage device, the connection is usually a local area network connection. If privacy of data is ensured in another technical manner, the connection may be alternatively an Internet connection. This is not limited herein. Storage device management software is run on the management device 12, to manage the storage device. The user terminals communicate with the management device 12 by using clients of the management software that are installed in the user terminals. For example, the user terminal 11 corresponds to a user 1. When the user 1 wants to use the storage device, in the user terminal 11, the user 1 is connected to the management device 12 by using a client installed in the user terminal, and enters an account password of the user 1 by using the client. The entered account password is transmitted to the management device 12 for authentication. After the authentication succeeds, the user logs in to the management device 12 to perform a management operation on the storage device 13. The user terminal 11 sends operation data of the user 1 to the management device 12. The management device 12 processes the operation data, to manage or use the storage device.

After the user 1 logs in to the management device 12, a user interface provided by the management device 12 is displayed in the user terminal 11 by using the client, and the user 1 may perform the management operation on the storage device 13 by using the user interface displayed in the user terminal 11. After the user logs in to the management device 12, the user interface first displays a menu bar used to configure different resource instances of the storage device. The menu bar includes, for example, a plurality of menus used to configure a plurality of types of resource instances. The menu is an option displayed in the user interface, and the menu is linked with a configuration page of a corresponding resource instance. Therefore, the configuration page is displayed in the user interface after the user clicks on the menu. The resource instance includes, for example, a logical unit number (LUN) instance, a logical unit number group (Lun Group) instance, a disk domain instance, or a host instance. The user 1 may configure a plurality of resource instances by using any one of the menus. The logical unit number is a number used to mark a logical unit in the storage device. One logical unit number may correspond to one redundant array of independent disks (RAID) or one or more disk partitions. The logical unit number group is used to mark a logical unit group including a group of logical units. For example, when the user 1 clicks on a menu that is in the menu bar and that is used to create a Lun instance, the user terminal 11 displays, in a user interface, a plurality of input boxes used to configure the Lun instance. For example, the input boxes include a name input box and a capacity input box of the newly created Lun instance.

In this embodiment of this application, in the management device 12, a customized user interface is provided for the user 1 based on historical configuration data operated by the user 1. Specifically, for example, for a first user interface (referred to as a "home page" below) displayed when the user logs in to the management device 12, the management device 12 may determine, based on historical click frequency of the user 1 for menus in the home page, at least one menu in the home page menu bar displayed to the user 1, so that when opening the home page, the user 1 can conveniently and quickly find a menu required by the user 1. After the user 1 clicks on the menu, the management device 12 may determine, based on an instance name that is of an object (for example, a Lun object) and that is historically entered by the user 1 in an input box in a configuration page corresponding to the menu, a recommended instance name of the object. When the user 1 configures the instance name of the object, the recommended instance name may be automatically displayed in a user interface, so that the user 1 does not need to manually enter the instance name a plurality of times, thereby improving use efficiency and enhancing user experience. The management device 12 may alternatively determine a recommended parameter value of an object based on an instance parameter value that is of the object and that is historically entered by the user 1. When the user 1 configures the instance parameter value of the object, the recommended parameter value may be automatically displayed in a user interface, so that the user 1 does not need to manually enter the parameter value a plurality of times, thereby improving use efficiency and enhancing user experience.

It may be understood that a structure of the system 100 shown in FIG. 1 is merely an example instead of a limitation. For example, the system 100 may include only one storage device, and a plurality of user terminals are connected to the storage device by using a local area network. In this case, because a relatively small number of storage devices need to be managed, the storage device may be managed by directly running management software on the storage device without additionally using the management device 12. In this case, the user terminal 11 is directly connected to the storage device to configure the storage device. In addition, the foregoing management process performed by the management device 12 is performed by the storage device, that is, the storage device is also used as a management device.

Figure 2:
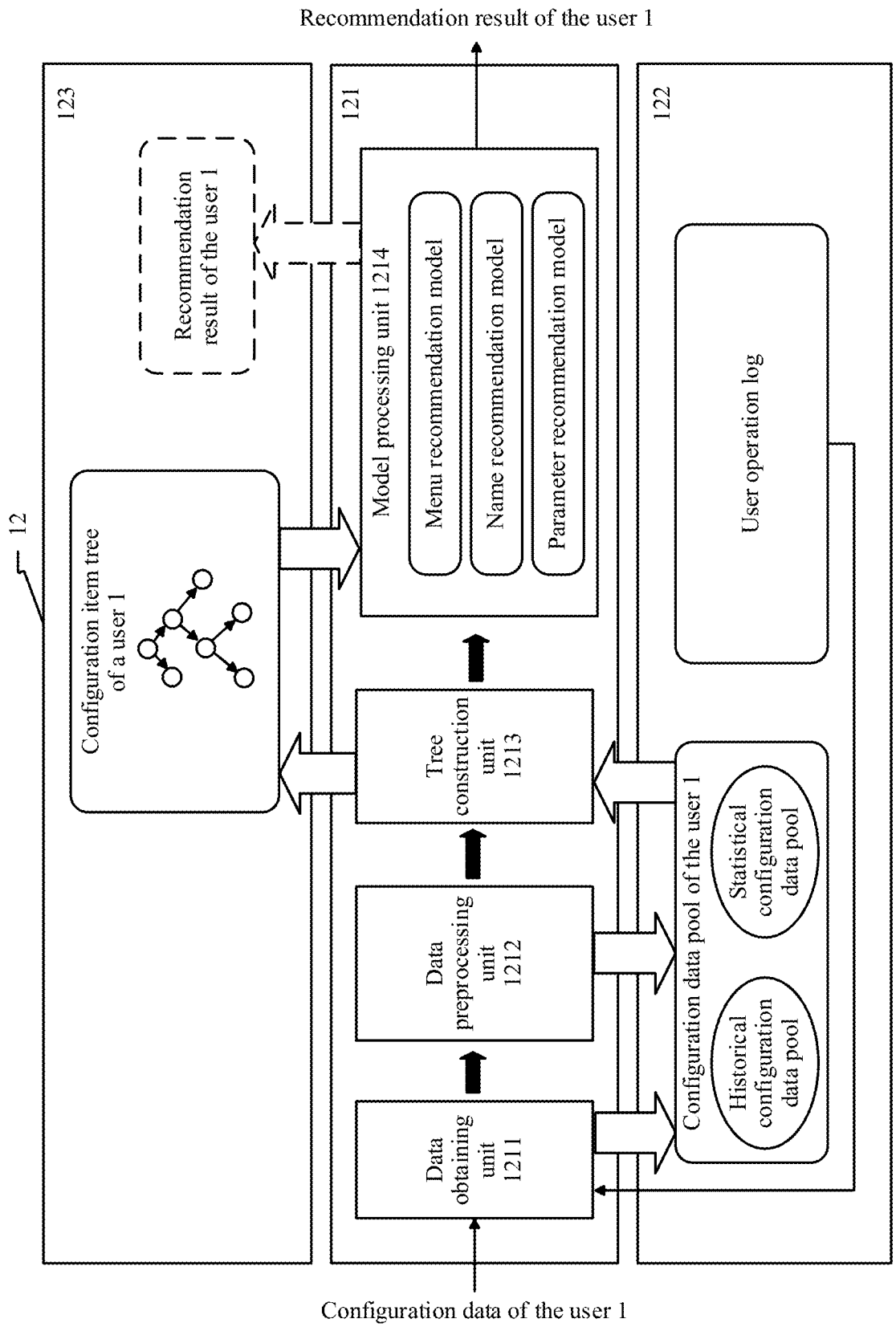
FIG. 2 is a schematic diagram of an architecture of a management device 12 according to an embodiment of this application.

FIG. 2 is a schematic diagram of an architecture of the management device 12 according to an embodiment of this application. As shown in FIG. 2, the management device 12 includes a processor 121, a storage medium 122, and a memory 123. The storage medium 122 is a persistent storage medium, such as a hard disk drive (HDD) or a solid-state drive (SSD). Computer executable program code (not shown) is stored in the storage medium 122. For example, the program code includes code modules, such as a data obtaining module, a data preprocessing module, a tree construction module, and a model processing module. The processor 121 may run the data obtaining module, the data preprocessing module, the tree construction module, and the model processing module, to enable the processor 121 to include a data obtaining unit 1211, a data preprocessing unit 1212, a tree construction unit 1213, and a model processing unit 1214. The model processing unit 1214 includes a menu recommendation model, a name recommendation model, and a parameter recommendation model that are used to perform recommendation for a user. For example, the data obtaining unit 1211, the data preprocessing unit 1212, the tree construction unit 1213, and the model processing unit 1214 may be implemented by separately executing corresponding program modules by using different processes, or may be implemented by sequentially executing corresponding program modules by using a same process.

When a user (for example, the user 1) performs, on the storage device 13, an operation of creating a resource instance or modifying a resource instance, the data obtaining unit 1211 obtains configuration data (configuration content that is submitted by the user and that is displayed in a user interface) of the user 1 for the resource instance, and stores the configuration data in a historical configuration data pool in a configuration data pool of the user 1. The historical configuration data pool records historical configuration data of the user 1 for the storage device 13. Then, the data preprocessing unit 1212 updates a statistical configuration data pool of the user 1 in the configuration data pool of the user 1 based on latest historical configuration data of the user 1. The statistical configuration data pool records statistical configuration data generated based on the historical configuration data of the user 1 for the storage device 13. Then, the tree construction unit 1213 obtains the statistical configuration data of the user 1 from the statistical configuration data pool of the user 1, constructs a configuration item tree (for example, a Trie tree (Trie tree)) of the user 1, and stores the configuration item tree in the memory 123. The configuration item tree includes a plurality of nodes respectively corresponding to configuration items, and each node includes statistical information of a corresponding configuration item.

When the user 1 performs a predetermined operation (for example, logs in to the management device, configures a resource instance name, or configures a resource instance parameter) in the user terminal 11, the model processing unit 1214 may read the configuration item tree of the user 1 from the memory 123; and obtain a recommended menu relative to the user 1 as a model recommendation result by using the menu recommendation model and based on statistical information in a node that is in the configuration item tree and that corresponds to a menu configuration item, obtain a recommended instance name relative to the user 1 as a model recommendation result by using the name recommendation model and based on statistical information in a node that is in the configuration item tree and that corresponds to an instance name configuration item, or obtain a recommended instance parameter value relative to the user 1 as a model recommendation result by using the parameter recommendation model and based on statistical information in a node that is in the configuration item tree and that corresponds to an instance parameter configuration item. After the model processing unit 1214 obtains the model recommendation result, the management device 12 may generate, based on the model recommendation result, a user interface displayed to the user 1, where the user interface includes the model recommendation result as display content; and send the generated user interface to the user terminal 11 for display in the user terminal 11.

Alternatively, the model processing unit 1214 may periodically obtain a plurality of recommended menus relative to the user 1 by using the menu recommendation model and based on information in the configuration item tree, and store the plurality of recommended menus in a recommendation result of the user 1 in the memory 123, so that after the user 1 logs in to the management device 12, the management device 12 can directly read the plurality of recommended menus from the memory, thereby reducing response time of the management device 12 for the user terminal 11.

In some cases, when a user (for example, the user 1) performs, on the storage device, an operation of creating a resource instance or modifying a resource instance, the management device 12 may restart or shut down due to a system fault or the like. In this case, a process in which the data obtaining unit 1211 obtains configuration data of the user and stores the configuration data in a historical configuration data pool is more complex than a process in which the data obtaining unit 1211 stores a configuration operation of the user in an operation log, for example, the data obtaining unit 1211 first needs to determine a configuration operation from a plurality of operations of the user. Therefore, when the management device 12 restarts, the data obtaining unit 1211 may have not stored, in the historical configuration data pool, configuration data that is of the user 1 for the resource instance and that is obtained before the restarting, but the management device 12 has already stored, in the storage medium 122 as an operation log, the configuration data that is of the user 1 for the resource instance and that is obtained before the restarting. Therefore, the data obtaining unit 1211 may periodically read the operation log in the storage medium 122, to supplement a configuration data pool of the user 1 with historical configuration data that is of the user 1 and that cannot be stored in the historical configuration data pool. The operation log is used to record all historical operation data of users. The historical operation data includes other operation data in addition to configuration operation data of the users for resource instances. For example, the data obtaining unit 1211 may use an identifier of the user 1, a resource instance, and a request type as keywords in the user operation log, to search the operation log for creation, modification, and deletion operations of the user 1 for the resource instance. After each time of reading the operation log of the user 1, the data obtaining unit 1211 supplements the configuration data pool of the user 1 with historical configuration data based on read operation log data.

When the user 1 performs a deletion operation on an existing resource instance in the storage device, the data obtaining unit 1211 may obtain the deletion operation, and delete, from the historical configuration data pool in the configuration data pool of the user 1, historical configuration data related to the resource instance deleted by the user 1. Correspondingly, the data preprocessing unit 1212 updates the statistical configuration data pool of the user 1 based on the deletion, and the tree construction unit 1213 correspondingly updates the configuration item tree of the user 1. The data obtaining unit 1211 deletes the foregoing data in the historical configuration data pool of the user 1, to ensure that data in the historical configuration data pool of the user 1 is configuration data that is relatively new in terms of time, so that a relatively accurate recommendation result can be provided for the user 1.

Correspondingly, when periodically reading the operation log of the user 1, the data obtaining unit 1211 may also read a deletion operation of the user 1 for a resource instance, determine whether data of the resource instance is deleted from the historical configuration data pool of the user 1, and if not, perform supplementary deletion.

It may be understood that the foregoing uses the user 1 as an example to describe a processing process of the management device 12 relative to an operation of the user 1. However, it is clear that, as shown in FIG. 1, the management device 12 is connected to the plurality of user terminals, that is, the management device 12 is to receive operation data of a plurality of users. Therefore, a configuration data pool of another user (for example, a user 2) is further disposed in the storage medium 122 of the management device 12. When the management device 12 receives, for example, configuration data of the user 2, likewise, the management device 12 may update the configuration data pool of the user 2 and correspondingly update a configuration item tree of the user 2 in the memory 123 by using the processor 121.

When the management device 12 starts, restarts, or encounters a thread disconnection, the processor 121 may quickly construct the configuration item tree of the user 1 based on the statistical configuration data pool of the user 1 in the configuration data pool of the user 1 and store the configuration item tree in the memory 123 by using the tree construction unit 1213.

It may be understood that the foregoing description provided for the management device 12 with reference to FIG. 2 is merely an example instead of a limitation. For example, the processor 121 may alternatively not include the tree construction unit 1213. After obtaining the statistical configuration data of the user 1, the data preprocessing unit 1212 may store the statistical configuration data of the user 1 in the memory 123, so that the model processing unit 1214 determines a recommended result relative to the user 1 based on the statistical configuration data.

The following specifically describes, in an embodiment form, a process of a method for displaying a user interface provided in embodiments of this application.

Figure 3:
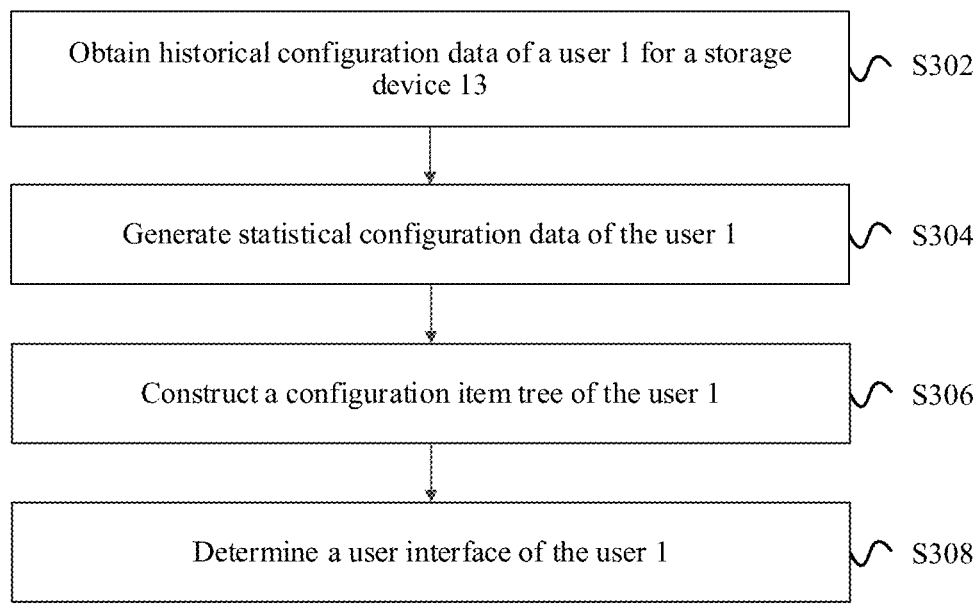
FIG. 3 is a flowchart of a method for displaying a user interface according to an embodiment of this application.

FIG. 3 is a flowchart of a method for displaying a user interface according to an embodiment of this application. The method is performed by the management device 12. As shown in FIG. 3, the method includes the following step S302 to step S308.

First, in step S302, after the user 1 configures the storage device 13 in a user interface, historical configuration data of the user 1 for the storage device 13 is obtained.

Figure 4:
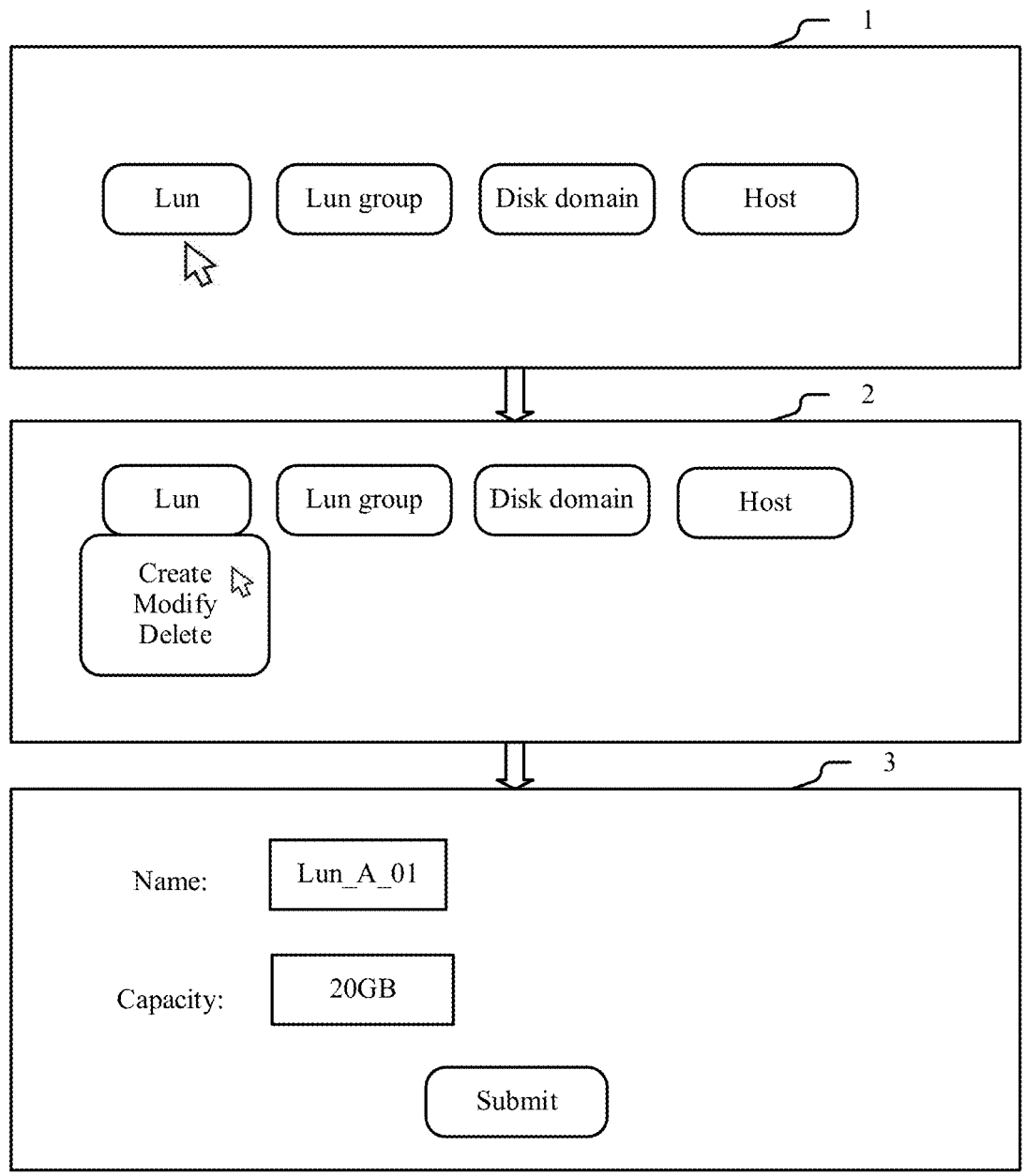
FIG. 4 is a schematic diagram of user interfaces displayed in a user terminal 11.

As described above, the management device 12 may communicate with the user terminal 11 to obtain configuration data entered by the user 1. FIG. 4 is a schematic diagram of user interfaces displayed in the user terminal 11. The user interfaces include an interface 1 to an interface 3. The interface 1 is, for example, a home page displayed in the user terminal after the user 1 logs in to the management device 12 by using a client. As shown in FIG. 4, the interface 1 shows a menu bar of management software. The menu bar includes a plurality of menus (FIG. 4 schematically shows four menus): a Lun, a Lun group, a disk domain, and a host. The plurality of menus are configuration content used to configure the storage device. Each menu corresponds to a preset resource object in the storage device 13, and the user 1 may configure a resource instance of a corresponding resource object by using a corresponding menu. For example, after the user 1 clicks on the menu "Lun" in the interface 1, the user terminal 11 displays the interface 2 in FIG. 4. In the interface 2, for example, three options are opened below the Lun menu: create, modify, and delete, so that the user 1 can manage a Lun resource instance by using the three options. For example, the user 1 clicks on the option "create" in the interface 2, so that the user terminal 11 displays the interface 3 in FIG. 4. The interface 3 shows input boxes in which the user needs to enter corresponding content. The input boxes include a name input box and a capacity input box. It may be understood that the interface 3 is merely an example instead of a limitation. In practice, when a Lun instance is created, the user may need to enter a plurality of other parameters such as an encryption password in addition to an instance name and an instance capacity. Therefore, more input boxes are correspondingly displayed in a corresponding configuration interface.

For example, the user terminal 11 communicates with the management device 12 by using a representational state transfer (REST) interface. Specifically, the user terminal 11 calls a corresponding operation instruction of the REST interface in a specific button of a user interface, to send a corresponding indication and parameter to the management device 12. The REST interface includes the following common operation instructions: POST (resource instance creation), PATCH (resource instance updating), and DELETE (resource instance deletion). For example, the following settings may be performed in the user terminal 11: In the interface 2, the "create" option is set to calling the POST instruction of the REST interface, the "modify" option is set to calling the PATCH instruction of the REST interface, and the "delete" option is set to calling the DELETE instruction of the REST interface.

In this case, for example, the user 1 first clicks on the option "create" in the interface 2. As shown in FIG. 4, the user terminal 11 displays the name input box and the capacity input box in the interface 3. After the user 1 enters corresponding content in the two input boxes and performs submission as shown in FIG. 4, the user terminal 11 sends, to the management device 12, a creation request including, for example, the following structured data: POST/Lun/Lun_A_01/20 GB/Session. For example, the creation request has a JSON format. The interface 3 is an interface used to manage the storage device, and content "Lun_A_01" and "20 GB" displayed in the interface 3 is configuration content used to configure the storage device. After receiving the creation request, the management device 12 parses the creation request based on a predetermined structure. "Session" is a hypertext transfer protocol (HTTP) session that is between the user terminal 11 and the management device 12 and that is used when the user terminal 11 performs this operation, and the management device 12 may determine, based on the session, that the creation request is sent by the user terminal 11 of the user 1. Therefore, the management device 12 may indicate, based on the request from the user terminal 11, the storage device 13 to create a Lun instance with a name Lun_A_01 and a capacity 20 GB for the user 1. After the Lun instance is created, the user 1 may perform an operation, for example, store data in the Lun instance or read data from the Lun instance, by using the user terminal 11.

After the Lun_A_01 instance is created, for example, if the user 1 wants to modify the capacity of the instance, the user 1 clicks on the option "modify" in the interface 2, and the user terminal 11 displays, in response to the clicking, options respectively corresponding to created Lun instances. For example, the options include an option corresponding to the created "Lun_A_01" instance. After the user clicks on the option, the user terminal 11 displays, for example, a capacity input box, to facilitate modification of the user 1 for the capacity of the "Lun_A_01" instance. For example, after the user 1 enters "30 GB" in the capacity input box and performs submission, the user terminal 11 sends, to the management device 12, a modification request including, for example, the following structured data: PATCH/Lun/Lun_A_01/30 GB/Session. After receiving the modification request, the management device 12 indicates the storage device 13 to modify the capacity of the Lun instance with the name "Lun_A_01" to 30 GB.

When the user 1 no longer needs the Lun instance, the user 1 clicks on, for example, the option "delete" in the interface 2, and the user terminal 11 displays, based on the clicking, options respectively corresponding to created Lun instances. For example, the options include an option corresponding to the created "Lun_A_01" instance. After the user clicks on the option, the user terminal 11 sends, to the management device 12, a deletion request including, for example, the following structured data: DELETE/Lun/Lun_A_01/Session. After receiving the deletion request, the management device 12 indicates the storage device 13 to delete the Lun instance with the name "Lun_A_01" from the storage device 13.

In addition, when receiving operation data of users, the management device 12 numbers the operation data based on a receiving time sequence. In addition, the data obtaining unit 1211 determines whether the operation data is one of the three requests. For example, it may be determined whether operation data of a user includes a keyword "POST", "PATCH", or "DELETE", to determine whether the operation data is one of the three requests. If the data obtaining unit 1211 determines that an operation of the user 1 is one of the three requests, the data obtaining unit 1211 updates the historical configuration data pool of the user 1 based on the request operation.

Specifically, when a request from the user terminal 11 of the user 1 includes the instruction POST, the data obtaining unit 1211 stores, in the historical configuration data pool of the user 1, an instance name and parameter included in the request and a number assigned by the management device to the request. The number reflects a time sequence in which the management device 12 receives the request. For example, if the request is the creation request including POST/Lun/Lun_A_01/20GB/Session, and the number of the request is 1, the data obtaining unit 1211 stores "Lun_A_01" and "20 GB" in the request and the number "1" of the request in the historical configuration data pool of the user 1. For example, the historical configuration data pool includes a data table 1 used to record data of a Lun instance. As shown in the data table 1, the data obtaining unit 1211 may record "Lun_A_01", "20 GB", and the number "1" in fields of a row (for example, the first row) in the data table 1.

| Data table 1 | | | |
|---|---|---|---|
| Row number | Instance name | Capacity | Request number |
| 1 | Lun_A_01 | 20GB | 1 |

When a request from the user terminal 11 of the user 1 includes the instruction PATCH, the data obtaining unit 1211 stores a modified parameter included in the request and a number of the request in the historical configuration data pool of the user 1. For example, if the request is the modification request including PATCH/Lun/Lun_A_01/30

GB/Session, and the number of the request is 5, the data obtaining unit 1211 stores "30 GB" and "5" in the second row in the data table 1 as shown in the following data table 1.

Data table 1

| Row number | Instance name | Capacity | Request number |
|---|---|---|---|
| 1 | Lun_A_01 | 20GB | 1 |
| 2 |  | 30GB | 5 |

When a request from the user terminal 11 of the user 1 includes the instruction DELETE, the data obtaining unit 1211 deletes historical configuration data of a corresponding resource instance from the historical configuration data pool of the user 1. For example, if the request is the deletion request including DELETE/Lun/Lun_A_01/Session, the data obtaining unit 1211 may delete the first row and the second row in the data table 1.

In addition, as described above with reference to FIG. 2, when receiving the operation data of the users, the management device 12 further stores the operation data in the user operation log in the storage medium 122. In other words, the user operation log records various types of operation data of a plurality of users. For example, when the user 1 sends, to the management device 12 by using the user terminal 11, the creation request including, for example, POST/Lun/Lun_A_01/20GB/Session, the management device 12 stores, for example, POST/Lun/Lun_A_01/20GB/UID1/1 in the user operation log as an operation log. "UID1" is an identifier of the user 1, and "i" is a request number corresponding to the operation log. When the user 1 sends, to the management device 12 by using the user terminal 11, the modification request including, for example, PATCH/Lun/Lun_A_01/30 GB/Session, the management device stores, for example, PATCH/Lun/Lun_A_01/30GB/UID1/5 in the user operation log as an operation log. When the user 1 sends, to the management device 12 by using the user terminal 11, the deletion request including, for example, DELETE/Lun/Lun_A_01/Session, the management device 12 stores DELETE/Lun/Lun_A_01/UID1/6 in the user operation log as an operation log.

In some cases, for example, when the management device 12 is powered off or restarts due to a fault, the data obtaining unit 1211 may have not stored, in the historical configuration data pool of the user 1, request data that is of the user 1 and that is obtained before the restarting. Therefore, in addition to obtaining request data of the user 1 when the user performs configuration, the data obtaining unit 1211 may periodically read the user operation log, to supplement the historical configuration data pool of the user 1. Specifically, every predetermined time period, the data obtaining unit 1211 may separately use "POST and UID1", "PATCH and UID1", and "DELETE and UID1" as keywords to search a user operation log in the predetermined time period for operation logs that are of the user 1 and that correspond to the foregoing three request types. For example, the predetermined time period is a time period between previous search time and current search time.

After the searching is completed, for example, if the found operation logs of the user 1 include POST/Lun/Lun_B_02/30GB/UID1/3, the data obtaining unit 1211 determines whether the historical configuration data pool of the user 1 includes a record of data corresponding to the operation log, that is, determines whether the data table 1 includes a row numbered 3. If yes, it indicates that the related data of the operation log is recorded in the historical configuration data pool of the user 1; or if no, the data obtaining unit 1211 further determines whether found request type operations of the user include a deletion request for a Lun instance with a name "Lun_B_02", and if no, it indicates that the related data of the operation log is omitted to be recorded. Therefore, the data obtaining unit 1211 may insert the related data of the operation log in the data table 1 based on the number "3" in the operation log POST/Lun/Lun_B_02/30GB/UID1/3. For example, the related data of the operation log may be inserted between the first row and the second row in the data table 1. For example, if the found operation logs of the user 1 include POST/Lun/Lun_A_02/30GB/UID1/6, similar to the foregoing description, the data obtaining unit 1211 determines whether related data of the operation log is omitted to be recorded in the historical configuration data pool of the user 1; and if determining that the related data is omitted to be recorded, similar to the foregoing description, the data obtaining unit 1211 adds a row corresponding to the operation log to the data table 1. The following shows a data table 1 obtained after a row with the request number 3 and a row with the request number 6 are inserted.

Data table 1

| Row number | Instance name | Capacity | Request number |
|---|---|---|---|
| 1 | Lun_A_01 | 20 GB | 1 |
| 2 | Lun_B_02 | 30 GB | 3 |
| 3 |  | 30 GB | 5 |
| 4 | Lun_A_02 | 30 GB | 6 |

For example, if the found operation logs that are of the user 1 and that correspond to the three request types include PATCH/Lun/Lun_A_01/40GB/UID1/7, similar to the foregoing description for the foregoing operation log, the data obtaining unit 1211 determines whether related data of the operation log is omitted to be recorded in the historical configuration data pool of the user 1; and if determining that the related data is omitted to be recorded, similar to the foregoing description, the data obtaining unit 1211 adds a row corresponding to the operation log to the data table 1. The following shows a data table 1 obtained after one row is inserted.

Data table 1

| Row number | Instance name | Capacity | Request number |
|---|---|---|---|
| 1 | Lun_A_01 | 20 GB | 1 |
| 2 | Lun_B_02 | 30 GB | 3 |
| 3 |  | 30 GB | 5 |
| 4 | Lun_A_02 | 30 GB | 6 |
| 5 |  | 40 GB | 7 |

For example, if the found operation logs that are of the user 1 and that correspond to the three request types include DELETE/Lun/Lun_A_01/UID1/8, the data obtaining unit 1211 determines whether rows with numbers less than 8 in the data table 1 include a row with an object name Lun and an instance name "Lun_A_01". If yes, the row is omitted to be deleted, and therefore supplementary deletion is performed on the row.

The foregoing uses the three request operations of the user 1 for the Lun instance as an example to describe a process in which the data obtaining unit 1211 obtains data and examples of content and a form of data stored in the historical configuration data pool. As shown in the interface 1 in FIG. 4, the user may click on any menu in the interface 1, to implement the three request operations on a corresponding resource instance. For example, the user 1 creates a Lun group instance by clicking on a creation option in the menu "Lun group" in the interface 1. FIG. 5 shows a user interface displayed when the user 1 creates a Lun group. As shown in FIG. 5, the interface includes the following input items: a Lun group name, a Lun number, a Lun name, and a capacity. The Lun number is a number of Lun instances included in the Lun group. For example, the user 1 enters 3 in a Lun number input box, and then three groups of Lun name input boxes and capacity input boxes are displayed in the interface. For example, if the user 1 separately enters LG_A_01, LG_A_02, and LG_A_03 in three Lun name input boxes, and enters 30 GB in three capacity input boxes, the user terminal 11 of the user 1 sends, to the management device 12, a creation request including, for example, the following structured data: POST/LG/LG_A_01/3/Lun_A_01/30GB//Lun_A_02/30GB//Lun_A_03/30 GB/Session.

Likewise, after receiving the creation request, the management device 12 numbers the request. In addition, the data obtaining unit 1211 updates the historical configuration data pool of the user 1 based on the creation request. For example, the historical configuration data pool includes a data table 2 used to record data of a Lun group instance, so that the data obtaining unit 1211 can record related data of the creation request in a row of the data table 2.

When the user 1 sends a modification request for the LG_A_01 instance to the management device 12 by using the user terminal 11, the data obtaining unit 1211 stores an instance name (LG_A_01) and a modified parameter that are included in the modification request and a number of the request in the data table 2. When the user 1 sends a deletion request for the LG_A_01 instance to the management device 12 by using the user terminal 11, similar to the foregoing description, the data obtaining unit 1211 deletes data of the LG_A_01 instance from the data table 2.

The following shows the data table 2.

| Data table 2 | | | | | |
|---|---|---|---|---|---|
| Row number | Instance name | Lun number | Lun name | Lun capacity | Number |
| 1 | LGA01 | 3 | Lun_A_01 | 30 GB | 9 |
|   |       |   | Lun_A_02 | 30 GB |   |
|   |       |   | Lun_A_03 | 30 GB |   |
| 2 | LGAO1 |   |          | 40 GB | 12 |
| 3 | LGA02 | 2 | Lun_B_01 | 20 GB | 15 |
|   |       |   | Lun_B_02 | 30 GB |   |
| 4 | LGA03 | 3 | Lun_A_04 | 30 GB | 16 |
|   |       |   | Lun_A_05 | 30 GB |   |
|   |       |   | Lun_A_06 | 20 GB |   |
| 5 | LGBO1 | 3 | LG_B_01  | 20 GB | 17 |
|   |       |   | LG_B_02  | 20 GB |   |
|   |       |   | LG_B_03  | 30 GB |   |

It may be understood that the foregoing content and record form of the data recorded in the historical configuration data pool and the foregoing content and record form of the data recorded in the user operation log are all examples instead of limitations. For example, related data and receiving numbers (or receiving time) of POST, PATCH, and DELETE type requests of the user 1 may be all recorded in the historical configuration data pool. Then, user operation logs of the user 1 in a predetermined time period may be periodically read, and numbers of the user operation logs are matched with numbers of rows of data in the predetermined time period in the historical configuration data pool, to determine whether there is data omitted to be recorded in the historical configuration data pool. In this record manner, a relatively old record in the historical configuration data pool may be periodically deleted, so that data in the historical configuration data pool is relatively new data.

In step S304, statistical configuration data of the user 1 is generated.

Referring to FIG. 2, the statistical configuration data of the user 1 may be generated based on the historical configuration data of the user 1 by using the data preprocessing unit 1212.

For the data table 1, the data preprocessing unit 1212 is preset to perform the following three types of statistical processing: performing statistics collection on click frequency of the Lun menu, and using the click frequency as statistical information of a Lun menu configuration item (an identifier of the configuration item is, for example, Lun); performing statistics collection on name prefixes of instance names of Lun instances, frequency of the name prefixes, and latest suffixes of the name prefixes, and using the name prefixes, the frequency, and the latest suffixes as statistical information of a name configuration item (an identifier of the configuration item is, for example, Lun_nm); and performing statistics collection on parameter values of parameters and frequency of the parameter values, and using the parameter values and the frequency as statistical information of a parameter configuration item (for example, a capacity configuration item identified as Lun_sz). After performing statistics collection, the data preprocessing unit 1212 records statistical results in the statistical configuration data pool in the configuration data pool of the user 1 in FIG. 2. For example, the statistical configuration data pool is recorded by using a data table 3, and the data table 3 includes statistical information of configuration items. The following shows some configuration items and statistical information of the configuration items in the data table 3.

| Data table 3 | |
|---|---|
| Lun | 4 |
| Lun_nm | Lun_A, 2, 02; Lun_B, 1, 02 |
| Lun_sz | 30, 3; 20, 1 |

In the data table 3, the configuration item Lun corresponds to the Lun menu in the interface 1 shown in FIG. 4, and statistical information "4" of the configuration item is access frequency (the click frequency) of the Lun menu. To obtain the statistical information, the data preprocessing unit 1212 may count a number of rows in the data table 1. Each row in the data table 1 corresponds to one creation request or modification request for a Lun instance, and sending of the user terminal 11 for the two types of requests corresponds to clicking of the user on the Lun menu in the interface 1 in FIG. 4. Therefore, the click frequency of the Lun menu may be obtained by counting the number of rows in the data table 1.

The configuration item Lun_nm corresponds to the name input item in the interface 3 in FIG. 4. Prefixes, input frequency of the prefixes, and latest suffixes of the prefixes that are included in a plurality of instance names of Lun instances are recorded in the statistical information of the configuration item. For example, for Lun_A, 2, 02, "Lun_A"

is a prefix in a Lun instance name entered by the user 1, "2" is input frequency of the prefix "Lun_A" in the Lun instance name entered by the user 1, and "02" is a latest suffix corresponding to the prefix "Lun_A". To obtain the statistical information, the data preprocessing unit 1212 first obtains a plurality of instance names included in an instance name column in the data table 1, so that the following three Lun instance names can be obtained: "Lun_A_01", "Lun_A_02", and "Lun_B_02". Then, the data preprocessing unit 1212 may separately segment the instance names into prefixes and suffixes by using a preset word segmentation unit. The segmentation is performed based on a preset word segmentation dictionary in the data preprocessing unit 1212. The word segmentation dictionary may be an open-source word segmentation library (for example, a jieba word segmentation library), or may be a custom word segmentation dictionary. If the word segmentation dictionary is a custom word segmentation dictionary, the management device 12 may update the custom word segmentation dictionary based on an instance name used by the user in a predetermined time period. Specifically, for example, if the word segmentation dictionary includes segmented words "Lun_A" and "Lun_B", the data preprocessing unit 1212 may segment "Lun_A_01" into a prefix "Lun_A" and a suffix "01", segment "Lun_A_02" into a prefix "Lun_A" and a suffix "02", and segment "Lun_B_02" into a prefix "Lun_B" and a suffix "02" based on the two segmented words. After the instance names are segmented into the prefixes and the suffixes, the prefixes and frequency of the prefixes are obtained. For example, the prefixes "Lun_A" and "Lun_B" may be obtained, input frequency of the prefix "Lun_A" is 2, and input frequency of the prefix "Lun_B" is 1. Finally, latest suffixes (for example, a suffix of an instance name that is lately entered by the user 1 and whose prefix is "Lun_A") corresponding to the prefixes are obtained, that is, a latest suffix "02" of the prefix "Lun_A" and a latest suffix "02" of the prefix "Lun_B" may be obtained.

The configuration item Lun_sz corresponds to the capacity input item in the interface 3 in FIG. 4. Capacities of a plurality of Lun instances and input frequency of the capacities are recorded in statistical information of the configuration item. For example, "20, 1" indicates that the user has configured one Lun instance with a capacity 20 GB. To obtain the statistical information, the data preprocessing unit 1212 first obtains capacity values in a capacity column in the data table 1, for example, may obtain 20 GB, 30 GB, 30 GB, and 30 GB; and obtains at least one non-repetitive capacity value in the plurality of obtained capacity values and input frequency of the at least one non-repetitive capacity value, so that the following two non-repetitive capacity values and input frequency of the two non-repetitive capacity values can be obtained: 20, 1; and 30, 3.

After each time of updating the historical configuration data pool, the data obtaining unit 1211 may notify the data preprocessing unit 1212 of the updating performed on the historical configuration data pool, so that the data preprocessing unit 1212 correspondingly performs statistics collection and updates the statistical configuration data pool. For example, after the data obtaining unit 1211 inserts the fifth row in the data table 1 as described above, the data obtaining unit 1211 notifies the data preprocessing unit 1212 of the insertion of the fifth row, so that the data preprocessing unit 1212 updates the data table 3 based on specific content of the inserted fifth row. Specifically, because one row is added to the data table 1, that is, the click frequency of the menu Lun is increased by 1, the data preprocessing unit 1212 increases the frequency in Lun in the data table 3 by 1; and because a capacity in the fifth row in the data table 1 is 40 GB, that is, one capacity value is added to the capacity column, the data preprocessing unit 1212 adds "40, 1" to the statistical information of Lun_sz in the data table 3. The following shows some configuration items and statistical information of the configuration items in a data table 3 obtained after the foregoing updating.

| Data table 3 | |
|---|---|
| Lun | 5 |
| Lun_nm | Lun_A, 2, 02; Lun_B, 1, 02 |
| Lun_sz | 30, 3; 20, 1; 40, 1 |

The following shows some configuration items and statistical information of the configuration items in a data table 3 in another form.

| Data table 3 | |
|---|---|
| Lun | 5 |
| Lunnm | Lun_A, 2, 02; Lun_B, 1, 02/Lun_A, 02 |
| Lunsz | 30, 3; 20, 1; 40, 1/40 |

A difference between the data table 3 and the previous data table 3 lies in that statistical information of a Lun_nm configuration item further includes "Lun_A, 02", and a Lun_sz configuration item further includes "40". "Lun_A" is a prefix of a Lun instance name lately entered by the user 1, "02" is a suffix of the instance name lately entered by the user 1, and "40" is a capacity of an Lun instance lately entered by the user 1. Related information of the latest Lun instance name is included in the statistical information of the Lun_nm configuration item, to be subsequently used to recommend the Lun instance name. The latest capacity of the Lun instance is included in statistical information of the Lun_sz configuration item, to be subsequently used to recommend the Lun instance capacity.

For the data table 2, the data preprocessing unit 1212 is preset to perform the following statistical processing: performing statistics collection on click frequency of the Lun group menu, and using the click frequency as statistical information of a Lun group menu configuration item (an identifier of the configuration item is, for example, Lun_g); as described above, performing word segmentation on a plurality of instance names of Lun group instances, performing statistics collection on name prefixes of the plurality of instance names of the Lun group instances, frequency of the name prefixes, latest suffixes of the name prefixes, and a prefix and a suffix of a latest instance name, and using the name prefixes, the frequency, the latest suffixes, the prefix, and the suffix as statistical information of a Lun group instance name configuration item (an identifier of the configuration item is, for example, Lun_g_nm); for a Lun number configuration item (an identifier of the configuration item is, for example, Lun_g_num) of the Lun group instances, performing statistics collection on Lun numbers corresponding to all the Lun group instance name prefixes and frequency of the Lun numbers; for a Lun instance name configuration item (an identifier of the configuration item is, for example, Lun_g_Lunnm) of at least two Lun instances included in the Lun group instances, performing statistics collection on Lun name prefixes corresponding to all the Lun group instance name prefixes, frequency of the Lun name prefixes, and latest suffixes of the Lun name prefixes; and for a Lun instance capacity configuration item (an identifier of the configuration item is, for example, Lun_g_Lunsz) of the at least two Lun instances included in the Lun group instances, performing statistics collection on Lun instance capacities corresponding to all the Lun group instance name prefixes and frequency of the Lun instance capacities. The following shows some configuration items and statistical information of the configuration items in a data table 3 generated based on the data table 1 and the data table 2.

| Data table 3 | |
|---|---|
| Lun | 10 |
| Lun_nm | Lun_B, 4, 05; Lun_A, 3, 03; Lun_C, 1, 01/Lun_C, 01 |
| Lun_sz | 30, 5; 20, 3; 40, 2/40 |
| Lun_g | 5 |
| Lun_g_nm | LG_A, 3, 03; LG_B, 1, 01/LG_B, 01 |
| Lun_g_num | LG_A, 3, 2; 2, 1/LG_B, 3, 1 |
| Lun_g_Lunnm | LG_A, Lun_A, 6, 06; Lun_B, 2, 02/LG_B, Lun_B, 3, 03 |
| Lun_g_Lunsz | LG_A, 30, 6; 20, 2; 40, 1/LG_B, 20, 2; 30, 1 |

Referring to the data table 3, the statistical information of the configuration item Lun_g is the click frequency of the Lun group menu. Similar to the foregoing description, the data preprocessing unit 1212 may determine the click frequency of the Lun group menu by collecting a number of rows in the data table 2. The configuration item Lun_g_nm corresponds to the Lun group name input item in FIG. 5, and the statistical information of the configuration item includes the prefixes included in the Lun group instance names, the frequency of the prefixes, the latest suffixes of the prefixes, and the prefix and the suffix of the latest Lun group instance name. For example, for LG_A, 3, 03, LG_A is a prefix included in the Lun group instance names, "3" is input frequency of the prefix LG_A, and "03" is a latest suffix corresponding to the prefix LG_A. "LG_B, of" at the end is a prefix and a suffix of a Lun group instance name lately entered by the user 1. The configuration item Lun_g_num corresponds to the Lun number input item in FIG. 5, and statistical information of the configuration item includes information respectively obtained through statistics collection relative to the Lun group name prefixes. For example, statistical information of the prefix LG_A is LG_A, 3, 2; 2, 1. "3, 2" indicates that the value 3 is entered twice, and "2, 1" indicates that the value 2 is entered once. The configuration item Lun_g_Lunnm corresponds to the Lun name input item in FIG. 5, and statistical information of the configuration item also includes information respectively obtained through statistics collection relative to the Lun group name prefixes. For example, statistical information of the prefix LG_A is LG_A, Lun_A, 6, 06; Lun_B, 2, 02. "Lun_A, 6, 06" indicates that, in Lun group instances whose prefixes are LG_A, a Lun instance whose prefix is Lun_A appears six times, and a latest suffix corresponding to the prefix Lun_A is 06. The configuration item Lun_g_Lunsz corresponds to the Lun capacity input item in FIG. 5, and statistical information of the configuration item also includes information respectively obtained through statistics collection relative to the Lun group name prefixes. For example, statistical information of the prefix LG_A is LG_A, 30, 6; 20, 2; 40, 1. "30, 6" indicates that the capacity value 30 is entered six times, "20, 2" indicates that the capacity value 20 is entered twice, and "40, 1" indicates that the capacity value 40 is entered once.

It may be understood that, in the foregoing, the statistical configuration data that is of the user 1 and that is shown in the data table 3 is obtained by using the data preprocessing unit 1212. This is not limited in this embodiment of this application. For example, in an implementation, for the Lun_nm configuration item, the data preprocessing unit 1212 obtains the instance names of the Lun instances from the data table 1, and records, in a sequence of the request numbers in the data table 1, the instance names in the statistical information that is in the data table 3 and that corresponds to Lun_nm; and for the Lun_sz configuration item, the data preprocessing unit 1212 obtains the capacity values of the Lun instances from the data table 1, and records, in the sequence of the request numbers in the data table 1, the capacity values in the statistical information that is in the data table 3 and that corresponds to Lun_sz. That is, in this implementation, the instance names and the capacity values are only sequentially recorded without further processing such as word segmentation and frequency statistics collection. The processing may be subsequently performed in a recommendation model.

In step S306, a configuration item tree of the user 1 is constructed.

Referring to FIG. 2, the configuration item tree of the user 1 may be constructed based on the statistical configuration data of the user 1 by using the tree construction unit 1213.

After each time of updating the statistical configuration data pool (for example, the data table 3), the data preprocessing unit 1212 may notify the tree construction unit 1213 to update the configuration item tree (for example, a Trie tree). The data preprocessing unit 1212 may send updated data of the data preprocessing unit 1212 for the data table 3 to the tree construction unit 1213, so that the tree construction unit 1213 can perform corresponding updating in the existing Trie tree.

The Trie tree is also referred to as a word search tree. A root node of the Trie tree does not include a character, and each node other than the root node includes at least one character. A concatenated character of characters of nodes on a path from the root node to a node is a character string corresponding to the node. The Trie tree organizes a plurality of character strings by using a tree structure, so that character strings with a common prefix are located in one subtree of the Trie tree. In this manner, a data storage amount is reduced, and data query time is also reduced.

Figure 6:
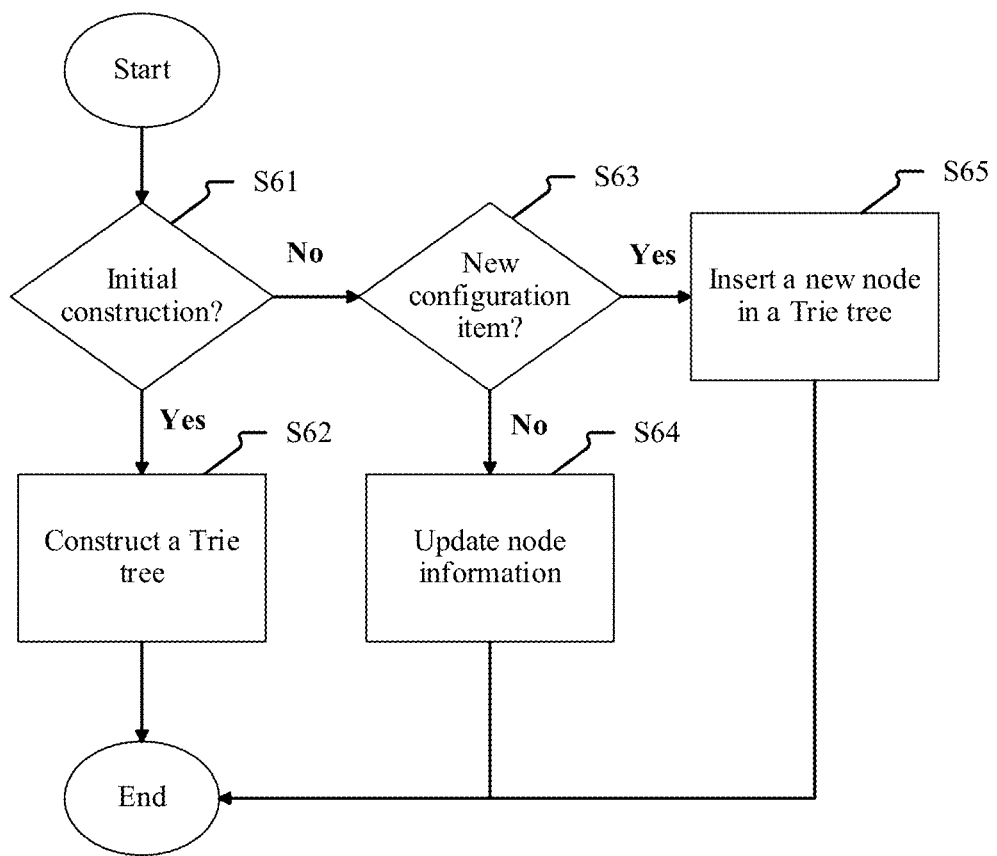
FIG. 6 is a flowchart of a method for constructing a Trie tree according to an embodiment of this application.

FIG. 6 is a flowchart of a method for constructing a Trie tree according to an embodiment of this application. The tree construction unit 1213 may start to perform the method shown in FIG. 6 after receiving a notification from the data preprocessing unit 1212. As described above, the tree construction unit 1213 is not limited to starting to perform the method shown in FIG. 6 after receiving the notification from the data preprocessing unit 1212. For example, the tree construction unit 1213 may start to perform the method shown in FIG. 6 after the management device 12 starts or restarts, or after the Trie tree of the user 1 in the memory is lost.

Referring to FIG. 6, first, in step S61, it is determined whether this time of construction is initial construction. The tree construction unit 1213 may determine whether the Trie tree of the user 1 is stored in the memory, to determine whether this time of construction is initial construction.

In step S62, if it is determined that this time of construction is initial construction, the tree construction unit 1213 constructs a Trie tree based on the data table 3 in the configuration data pool of the user 1. For example, during initial construction of the Trie tree, the tree construction unit 1213 constructs a Lun node under a root node of the Trie tree as a subnode based on the data table 3, where the Lun node corresponds to the Lun configuration item in the data table 3; and constructs subnodes, namely, an_nm node and an_sz node, under the Lun node, where the two nodes respectively correspond to the Lun_nm configuration item and the Lun_sz configuration item in the data table 3, and then respectively records statistical information of the configuration items of the subnodes in the subnodes.

In step S63, if it is determined that this time of construction is not initial construction, that is, when it is determined that the Trie tree of the user 1 is already stored in the memory, the tree construction unit 1213 determines, based on updated data of the data preprocessing unit 1212 for the data table 3, whether there is an added new configuration item in the updated data.

For example, this time of construction is performed after the data preprocessing unit 1212 updates the statistical information of the Lun configuration item and the Lun_sz configuration item in the data table 3. Therefore, in step S64, the tree construction unit 1213 updates node information in the Trie tree, that is, updates storage information of a Lun node and an_sz node in the Trie tree.

For example, this time of construction is performed after the data preprocessing unit 1212 adds a plurality of new configuration items to the data table 3. Therefore, in step S65, the tree construction unit 1213 inserts, in the Trie tree, new nodes respectively corresponding to the plurality of added new configuration items, and stores statistical information of corresponding configuration items in the new nodes.

Figure 7:
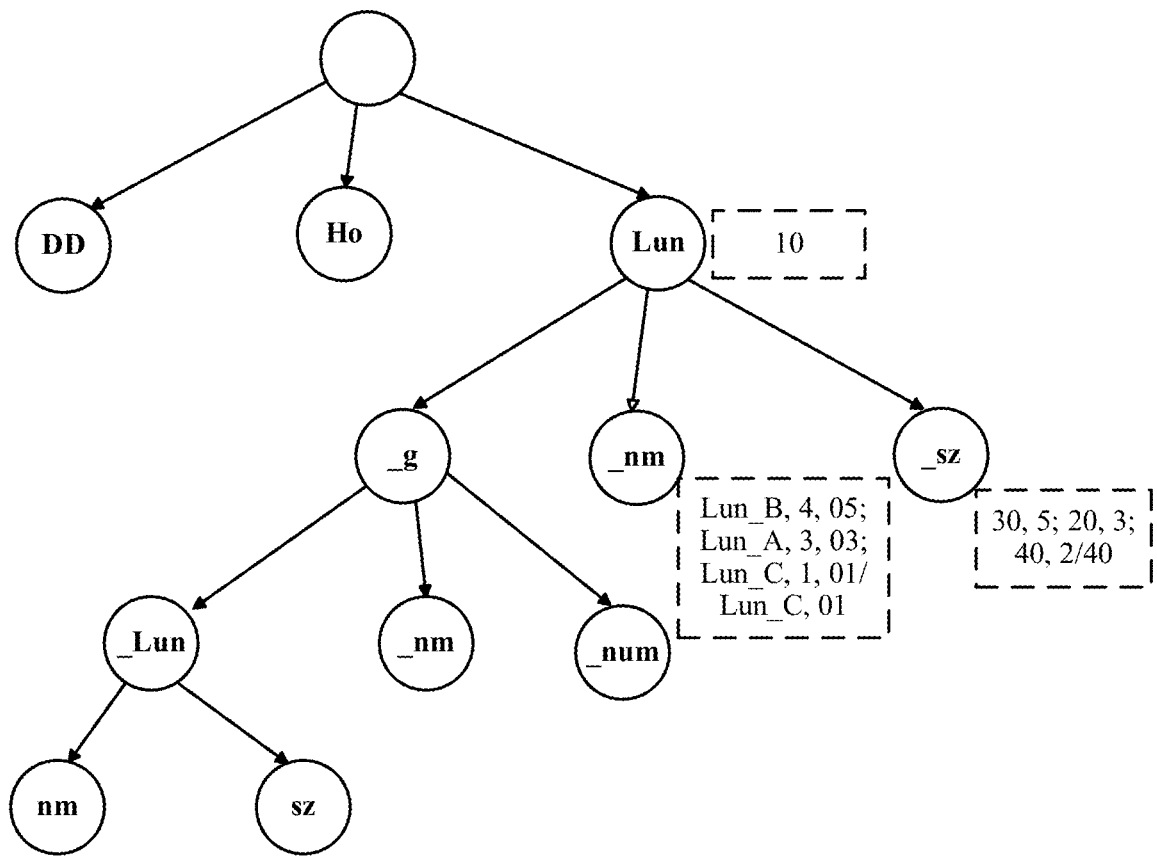
FIG. 7 shows a Trie tree that is of a user 1 and that is constructed by using a tree construction unit 1213.

FIG. 7 shows a Trie tree that is of the user 1 and that is constructed by using the tree construction unit 1213. The Trie tree shown in FIG. 7 corresponds to the data table 3. In the Trie tree shown in FIG. 7, three nodes, namely, a DD node, an Ho node, and a Lun node, are schematically shown under a root node. The DD node corresponds to a disk domain menu configuration item, and the Ho node corresponds to a host menu configuration item. FIG. 7 does not show subtrees under the DD node and the Ho node. The Lun node corresponds to the configuration item Lun in the data table 3, and the Lun node includes three subnodes: a_g node, an_nm node, and an_sz node. The three subnodes respectively correspond to the configuration items Lung, Lun_nm, and Lun_sz in the data table 3. The _g node includes three subnodes: a_Lun node, an_nm node, and an_num node. The _nm node and the_num node under the_g node respectively correspond to the configuration items Lun_g_nm and Lun_g_num in the data table 3. The _Lun node under the_g node includes two subnodes: an nm node, and an sz node. The two subnodes respectively correspond to the configuration items Lun_g_Lunnm and Lun_g_Lunsz in the data table 3.

In the tree structure shown in FIG. 7, statistical information of corresponding configuration items is stored in the nodes corresponding to the configuration items in the data table 3. FIG. 7 schematically shows statistical information of three nodes, namely, the Lun node, the_nm node, and the_sz node, in dashed-line boxes. Statistical information of the Lun node is the statistical information of the Lun configuration item in the data table 3, statistical information of the_nm node is the statistical information of the Lun_nm configuration item in the data table 3, and statistical information of the_sz node is the statistical information of the Lun_sz configuration item in the data table 3.

Compared with a tabular data record form, the Trie tree of the user 1 is constructed based on the data table 3, so that a total amount of data can be greatly reduced. For example, for the three configuration items Lung, Lun_nm, and Lun_sz, the three configuration items are set to the three subnodes of the Lun node in the Trie tree, so that "Lun" is omitted from names of the three configuration items, to reduce a data storage amount. In addition, because the subnodes are arranged in the Trie tree in alphabetical order, searching is facilitated, to increase a data query speed. As shown in FIG. 2, after constructing or updating the Trie tree of the user 1, the tree construction unit 1213 stores the Trie tree in the memory 123, so that the model processing unit 1214 can more quickly read data in the Trie tree subsequently, to further increase a processing speed.

It may be understood that the configuration item tree that is in a Trie tree form and that is shown in FIG. 7 is merely an example instead of a limitation. In this embodiment of this application, the configuration item tree may have another tree structure, provided that the tree structure can be used to reduce a data storage amount and increase a data query speed.

In step S308, a user interface of the user 1 is determined.

Referring to FIG. 2, by using the model processing unit 1214, model processing may be performed based on the statistical configuration data in the configuration item tree obtained in step S306, to determine the user interface of the user 1.

Referring to FIG. 2, the model processing unit 1214 includes the menu recommendation model, the name recommendation model, and the parameter recommendation model. As shown in FIG. 4 and FIG. 5, in the user interfaces displayed to the user 1 by the user terminal 11, the home page includes the menus corresponding to the menu configuration items, and the other configuration interfaces include the name input box corresponding to the name configuration item and the parameter input box corresponding to the parameter configuration item (for example, the capacity configuration item). Therefore, when the user terminal 11 is to display the home page, the management device 12 may determine, based on the Trie tree of the user 1 in the memory by using the menu recommendation model in the model processing unit 1214, a plurality of menus displayed in the home page, and the user terminal 11 displays the determined home page. The process is described below with reference to FIG. 8 to FIG. 10. When the user terminal 11 is to display the name input box, the management device 12 may determine, based on the Trie tree of the user 1 in the memory by using the name recommendation model in the model processing unit 1214, at least one name recommended to the user, and the user terminal 11 displays the at least one recommended name for user selection. The process is described below with reference to 11 and FIG. 12. When the user terminal 11 is to display the parameter input box, the management device 12 may determine, based on the Trie tree of the user 1 in the memory by using the parameter recommendation model in the model processing unit 1214, at least one parameter value recommended to the user, and the user terminal displays the at least one recommended parameter value for user selection. The process is described below with reference to FIG. 13. In another implementation, the model processing unit 1214 may alternatively determine, based on an instance name currently entered by the user and information in the Trie tree of the user 1, at least one recommended parameter value corresponding to the parameter input box. The process is described in detail below with reference to FIG. 14 and FIG. 15. When a name and a parameter of a child instance included in a parent instance are to be displayed in the user interface, the model processing unit 1214 may determine a recommended name and a recommended parameter value of the child instance based on a name that is of the parent instance and that is currently entered by the user and the information in the Trie tree of the user 1. The process is separately described in detail below with reference to FIG. 16 and FIG. 17.

It may be understood that the foregoing process of determining a user interface is merely an example instead of a limitation. The process of determining a user interface provided in this embodiment of this application is not limited to the foregoing process. For example, in an implementation, the historical configuration data of the user 1 may not be preprocessed, but the historical configuration data of the user 1 may be directly entered in a pre-trained or a preset recommendation model, to determine a user interface. That is, in the method for determining a user interface provided in this embodiment of this application, after the historical configuration data pool of the user 1 is obtained, a user characteristic of the user 1 is obtained based on the historical configuration data of the user 1, so that a user interface corresponding to the user 1 can be determined based on the user characteristic of the user 1, that is, a customized user interface is provided for the user 1.

Figure 8:
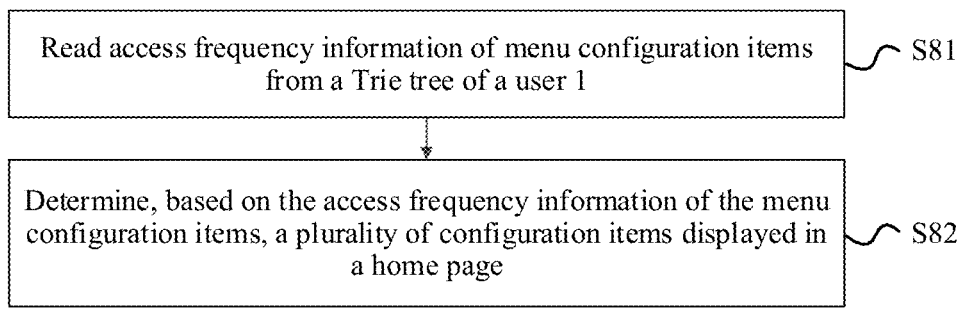
FIG. 8 is a flowchart of a method for determining a user interface by using a menu recommendation model.

FIG. 8 is a flowchart of a method for determining a user interface by using a menu recommendation model. In a procedure of the method, the menus included in the home page displayed to the user 1 are determined based on the Trie tree of the user 1 by using the menu recommendation model, that is, common menus are recommended to the user 1 by using the menu recommendation model. It may be understood that when the user 1 logs in to the management device 12 for the first time, no historical configuration data of the user 1 is recorded in the management device 12, and no Trie tree of the user 1 is stored in the memory. Therefore, the common menus cannot be recommended to the user 1 by using the menu recommendation model. In this case, the menus are displayed in the home page in a default manner.

As shown in FIG. 8, the method includes the following step S81 and step S82.

First, in step S81, access frequency information of the menu configuration items is read from the Trie tree of the user 1.

This step is performed by using, for example, the model processing unit 1214 in FIG. 2.

In an implementation, the model processing unit 1214 may perform step S81 and subsequent step S82 at a predetermined time interval, to periodically determine a home page displayed to the user 1, and store the home page in the memory, so that the management device 12 can directly obtain, in response to login of the user 1 from the memory, the home page displayed to the user 1, and send the determined home page to the user terminal 11, to enable the user terminal 11 to display the home page to the user 1. For example, the model processing unit 1214 may perform step S81 and step S82 at a predetermined moment every day, to determine a home page displayed to the user 1 next day.

In an implementation, after each time the tree construction unit 1213 constructs or updates a Trie tree of the user 1, the model processing unit 1214 may predetermine, by using the menu recommendation model, a home page displayed to the user 1, and store the home page in the memory, so that the management device 12 can directly obtain the home page displayed to the user 1 from the memory when the user 1 logs in to the management device 12, and send the determined home page to the user terminal 11, to enable the user terminal 11 to display the home page to the user 1.

In an implementation, recommendation is performed for the user by using the menu recommendation model in the model processing unit 1214. For example, after the user 1 logs in to the management device 12, the model processing unit 1214 in the management device 12 starts to run, to determine, by using the menu recommendation model, the home page displayed to the user 1. After the home page is determined, the management device 12 sends the determined home page to the user terminal 11, to enable the user terminal 11 to display the home page to the user 1.

In an implementation, as shown in FIG. 7, in the Trie tree, a leaf node corresponds to an instance name configuration item or an instance parameter configuration item, and a menu configuration item (for example, a Lun menu or a Lun group menu) usually corresponds to a non-leaf node. Therefore, the model processing unit 1214 reads each non-leaf node in the Trie tree, so that a node that corresponds to a menu configuration item and that is included in the Trie tree can be read; and reads access frequency of the corresponding menu configuration item from the node.

In an implementation, for example, identifiers of a plurality of menu configuration items in the management device 12 are preset in the menu recommendation model, and querying is performed on the Trie tree of the user 1 based on the identifiers of the menu configuration items. If a node corresponding to a menu configuration item can be found in the Trie tree, statistical information, namely, access frequency information, in the node can be read. If no node corresponding to a menu configuration item can be found in the Trie tree, it indicates that the user 1 has not accessed the menu configuration item.

Usually, a node corresponding to a specific character string is queried in the Trie tree by using the following steps: searching the subnodes of the root node for a first node including at least one character in the front of the character string, and then searching subnodes of the first node for a second node including at least one subsequent character of the character string. The process is repeated until an $n^{th}$ node including the last character of the character string is found. Characters respectively included in the first node, the second node, . . . , and the $n^{th}$ node are concatenated to form the character string, and therefore the $n^{th}$ node is the node corresponding to the character string.

For example, referring to FIG. 7, when the Lun menu configuration item is queried, assuming that an identifier of the Lun menu configuration item is Lun, a letter "l" may be first searched for under the root node. Because the subnodes under the root node are arranged in alphabetical order, it may be conveniently and quickly found that the Lun node under the root node is a node corresponding to the Lun menu configuration item, so that information "10" in the node can be read as access frequency of the Lun menu configuration item. When the Lun group menu configuration item is queried, assuming that an identifier of the Lun group menu configuration item is Lung, a character "_" may be searched for under the Lun node, so that access frequency of the Lun group menu configuration item can be read in the_g node.

In step S82, a plurality of configuration items displayed in the home page are determined based on the access frequency information of the menu configuration items.

Thousands of menu configuration items may be preset in the management device 12, and only a few of the plurality of menu configuration items may be menu configuration items frequently accessed by the user 1. Therefore, after the access frequency information of the user 1 for the menu configuration items is obtained, a menu configuration item with relatively high access frequency may be displayed in the home page as a common menu, and a menu configuration item with relatively low access frequency may be used as a hidden menu without being displayed in the home page.

In an implementation, after access frequency of the menu configuration items is obtained, normalization conversion may be performed on the access frequency in the menu recommendation model by using a tanh function, to convert the access frequency into values between 0 and 1. In addition, a threshold α (for example, α=0.9) is preset in the menu recommendation model. In the menu recommendation model, it is determined whether a normalized value of access frequency of each menu configuration item is greater than a. If the normalized value is greater than a, the menu configuration item is determined as a common menu displayed in the home page. If the normalized value is less than or equal to a, the menu configuration item is determined as a hidden menu not displayed in the home page. Normalization conversion is performed on the access frequency of the menu configuration items, and a common menu is determined based on the normalized values, so that the common menu of the user can be more accurately determined.

In another implementation, a predetermined number (for example, 20) of common menus displayed in the home page may be preset in the menu recommendation model. Therefore, after the access frequency of the menu configuration items is obtained, the menu configuration items are sorted based on the access frequency of the menu configuration items by using the menu recommendation model; and menu configuration items whose access frequency is ranked in the top 20 are determined as common menu configuration items displayed in the home page, and menu configuration items whose access frequency is ranked below 20 are determined as hidden menus not displayed in the home page.

In another implementation, a percentage (for example, 50%) may be preset in the menu recommendation model. Therefore, after the access frequency of the menu configuration items is obtained, the menu configuration items are sorted based on the access frequency of the menu configuration items by using the menu recommendation model; and menu configuration items whose access frequency is ranked in the top 50% are determined as common menu configuration items displayed in the home page, and menu configuration items whose access frequency is ranked in the bottom 50% are determined as hidden menus not displayed in the home page.

Figure 9:
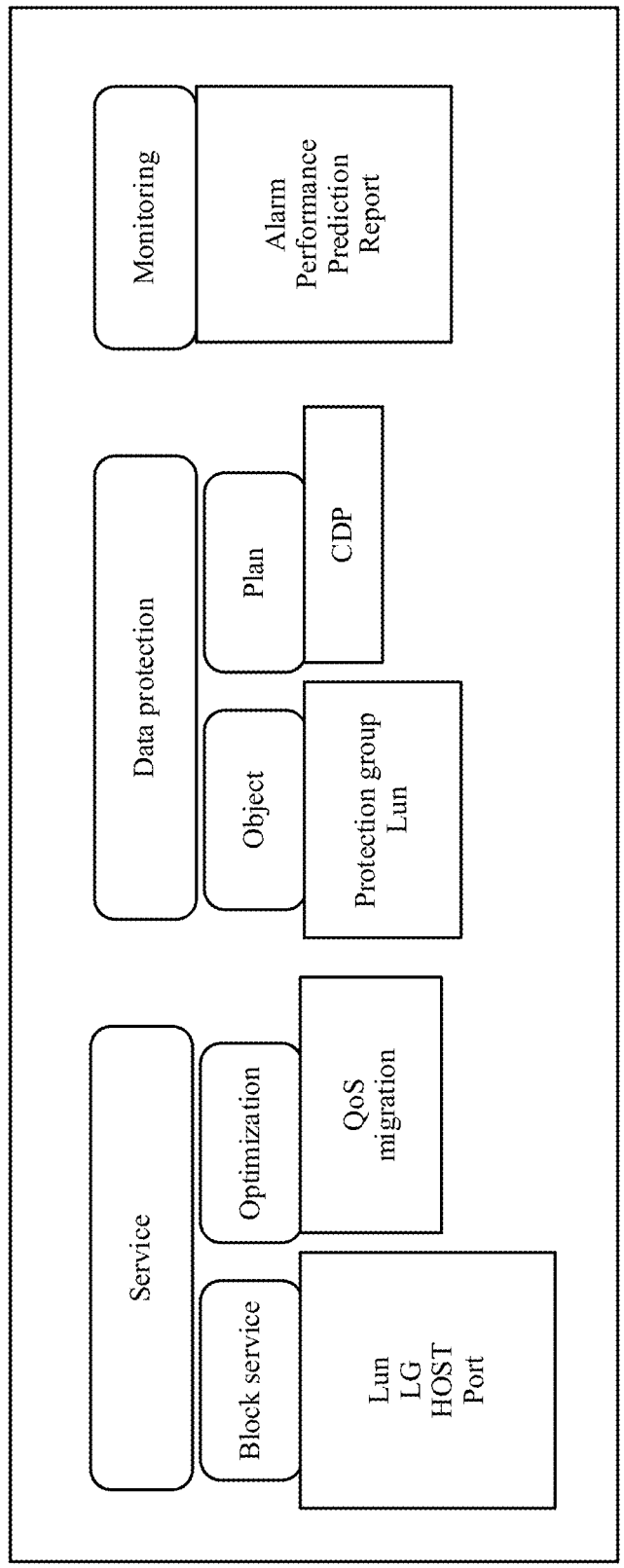
FIG. 9 is a schematic diagram of a home page of storage device management software in the conventional technology.
Figure 10:
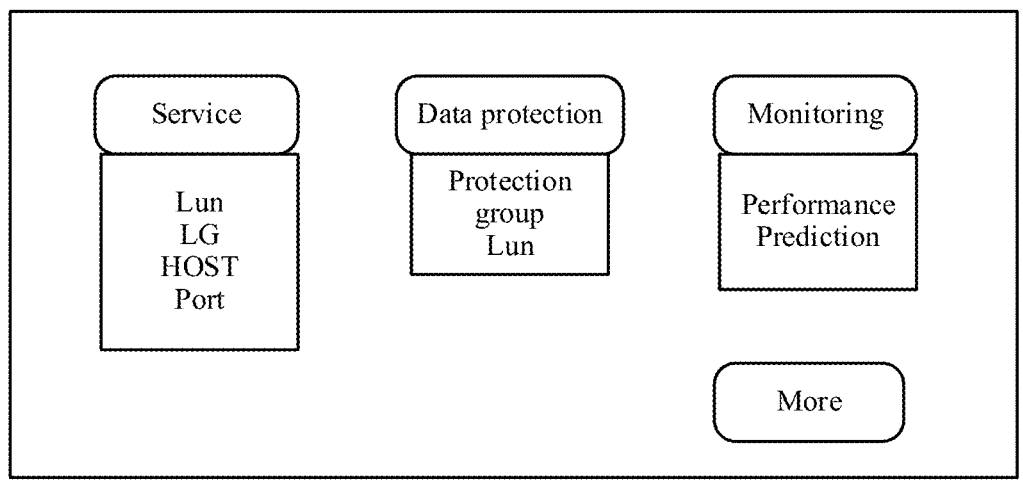
FIG. 10 is a schematic diagram of a home page of storage device management software according to an embodiment of this application.

FIG. 9 is a schematic diagram of a home page of storage device management software in the conventional technology. After a user performs clicking and submission, the home page shown in FIG. 9 becomes a user configuration interface used to configure a storage device, where a plurality of displayed menus are configuration content used to configure the storage device. The management device may obtain, based on the configuration content shown in FIG. 9 and clicking of the user on a menu in the user configuration interface, configuration data of a storage device configured for the user. A configuration object of the configuration data is a menu configuration item corresponding to the clicked menu. FIG. 10 is a schematic diagram of a home page of storage device management software according to an embodiment of this application. The home page shown in FIG. 10 is a user interface determined based on the configuration data obtained by using the user interface shown in FIG. 9. Menus in the home page shown in FIG. 10 are determined based on access frequency of the menus, that is, the menus shown in FIG. 10 are display content determined based on the configuration data obtained by using the configuration content shown in FIG. 9, to display common menus to the user. The home page that is in the conventional technology and that is shown in FIG. 9 includes numerous menu bars and menus, and therefore it is very difficult for the user 1 to quickly find a menu that the user 1 wants to access in so many menus. The home page that is provided in this embodiment of this application and that is shown in FIG. 10 displays only common menus of the user 1 without displaying non-common menus of the user 1, and the non-common menus are moved to a hidden menu bar corresponding to a "more" button, so that the user 1 can quickly find a menu that the user 1 wants to access in the home page, to greatly reduce operation time and improve user experience.

Figure 11:
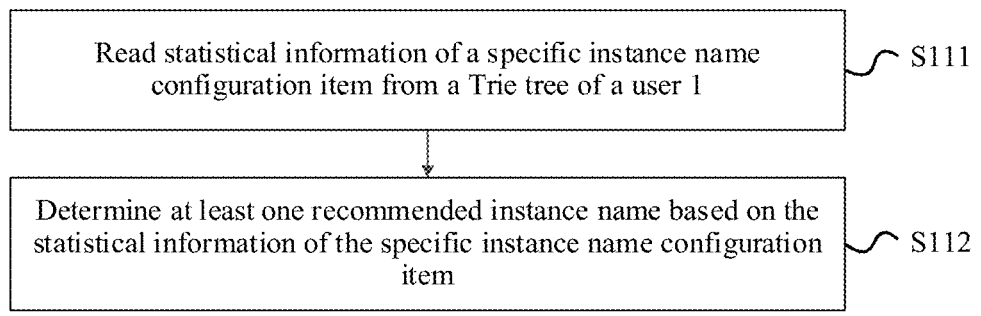
FIG. 11 is a flowchart of a method for determining a user interface by using a name recommendation model.

FIG. 11 is a flowchart of a method for determining a user interface by using a name recommendation model. The method is performed by the management device 12. In a procedure of the method, at least one recommended instance name that is displayed to the user 1 and that corresponds to a specific instance name configuration item is determined based on the Trie tree of the user 1 by using the name recommendation model.

As shown in FIG. 11, the method includes the following steps S111 and S112.

First, in step S111, statistical information of the specific instance name configuration item is read from the Trie tree of the user 1.

For example, as shown in the interface 2 in FIG. 4, after the user 1 clicks on the creation option in the Lun menu, the user terminal 11 sends, to the management device 12, a request for displaying an interface for configuring a Lun instance. Therefore, the model processing unit 1214 in the management device 12 starts to run, to determine, by using the name recommendation model, a recommended instance name that is of a Lun instance and that is displayed to the user 1 in the name input box. As described above, the name input box corresponds to the configuration item Lun_nm. Referring to FIG. 7, the model processing unit 1214 may query, in the Trie tree of the user 1, a node (a subnode of the Lun node: the_nm node) corresponding to the configuration item Lun_nm, and read statistical information that is of the configuration item Lun_nm and that is stored in the node.

In step S112, the at least one recommended instance name is determined based on the statistical information of the specific instance name configuration item.

For example, after obtaining, from the Trie tree in FIG. 7, the statistical information "Lun_B, 4, 05; Lun_A, 3, 03; Lun_C, 1, 01/Lun_C, 01" of the configuration item Lun_nm, the model processing unit 1214 parses the statistical information based on a predetermined data structure, so that the following meaning of the statistical information can be learned: In a plurality of Lun instance names entered by the user 1, the prefix Lun_B is used four times, and the prefix Lun_A is used three times. In addition, a latest suffix of the prefix Lun_A is 03, a latest suffix of the prefix Lun_B is 05, and a Lun instance name lately entered by the user 1 has a prefix Lun_C and a suffix 01.

For example, the model processing unit 1214 is preset to determine three recommended instance names. The model processing unit 1214 may sort prefixes based on frequency of the prefixes, and obtain two prefixes ranked in the top two, to constitute prefixes of recommended instance names. For example, the two prefixes ranked in the top two are Lun_B and Lun_A, where Lun_B is ranked above Lun_A. Then, the model processing unit 1214 determines suffixes in the recommended instance names based on latest suffixes of the prefixes. For example, the latest suffix of the prefix Lun_B is "05", and therefore a suffix of a recommended instance name with the prefix Lun_B may be determined as a number obtained by adding 1 to "05", namely, "06", so that the recommended instance name may be determined as Lun_B_06. Similarly, for the prefix Lun_A, a recommended instance name may be determined as Lun_A_04.

In addition to determining the recommended instance names based on the frequency of the prefixes and the latest suffixes of the prefixes as described above, a recommended instance name may be determined based on a prefix and a suffix of a Lun instance name lately entered by the user 1. For example, if the Lun instance name lately entered by the user 1 has a prefix Lun_C and a suffix 01, the recommended instance name may be determined as a Lun instance name Lun_C_02.

After the foregoing three Lun instance names are determined, the three names may be sorted based on a predetermined rule. For example, it may be considered that a Lun instance name lately entered by the user has greatest impact on a Lun instance name that the user wants to enter next time the user creates a Lun instance, and a prefix with higher frequency in Lun instance names entered by the user has greater impact on the Lun instance name that the user wants to enter next time the user creates the Lun instance. Therefore, the foregoing three Lun instance names may be sorted as follows: Lun_C_02>Lun_B_06>Lun_A_04.

After the foregoing determining process is completed, the model processing unit 1214 may send the three sorted recommended Lun instance names to the user terminal 11, so that the user terminal 11 can sequentially display the three recommended Lun instance names in a Lun instance name input box in the user interface, to perform recommendation for the user 1.

In an implementation, as described above, the statistical information that is of the Lun_nm configuration item and that is obtained by using the data preprocessing unit 1212 is Lun instance names arranged in a sequence of request numbers, that is, the statistical information corresponding to the Lun_nm node in the Trie tree of the user 1 is the Lun instance names arranged in the foregoing sequence. In this case, a word segmentation dictionary is further preset in the name recommendation model. After reading the statistical information of the Lun_nm configuration item from the Trie tree, the model processing unit 1214 separately segments the instance names into prefixes and suffixes based on the word segmentation dictionary by using the name recommendation model; and then obtains the prefixes, frequency of the prefixes, latest suffixes corresponding to the prefixes, and a prefix and a suffix of a latest instance name, so that the statistical information of the Lun_nm configuration item in the data table 3 can be obtained. Then, as described above, the at least one recommended instance name of the Lun instance may be determined based on the newly obtained statistical information of the Lun_nm configuration item.

Figure 12:
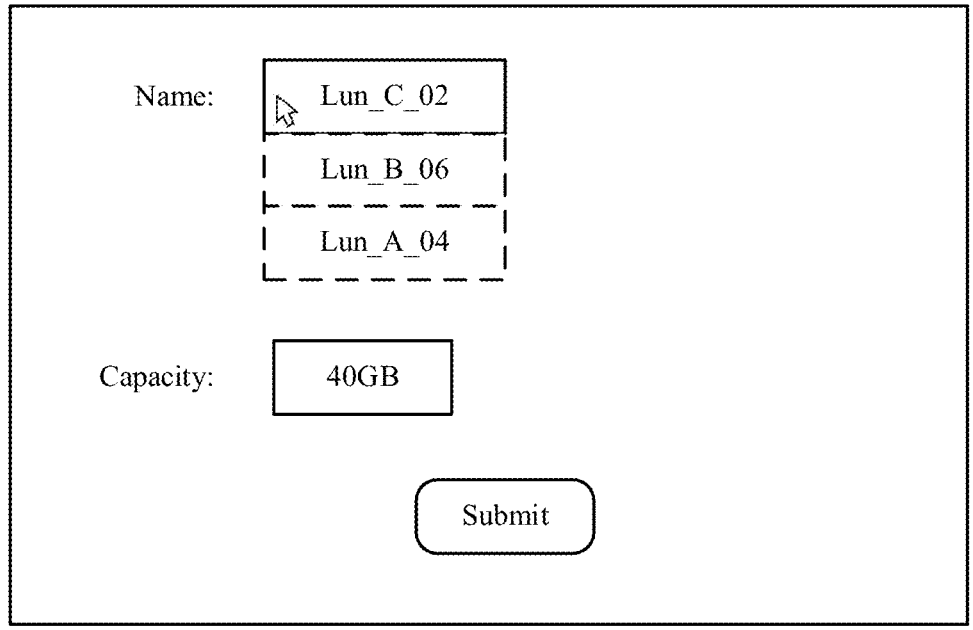
FIG. 12 is a schematic diagram of a user interface including a recommended instance name.

FIG. 12 is a schematic diagram of a user interface including a recommended instance name. As shown in FIG. 12, when the user terminal 11 displays, to the user 1, a user interface including a Lun instance name input box, a recommended name Lun_C_02 is automatically filled in the Lun instance name input box in the interface, and recommended names Lun_B_06 and Lun_A_04 are sequentially displayed in a drop-down menu of the input box. "Lun_C_02", "Lun_B_06", and "Lun_A_04" in the user interface shown in FIG. 12 are determined based on statistical information of an object (the name configuration item in the interface 3) configured by using the user interface, that is, "Lun_C_02", "Lun_B_06", and "Lun_A_04" are display content determined based on the configuration content in the interface 3 in FIG. 4, to recommend an instance name to the user. Therefore, the user 1 can complete entering in the name input box by clicking on one of the three recommended names, to reduce user operation time and improve user experience compared with manually filling in an instance name by the user 1.

Figure 13:
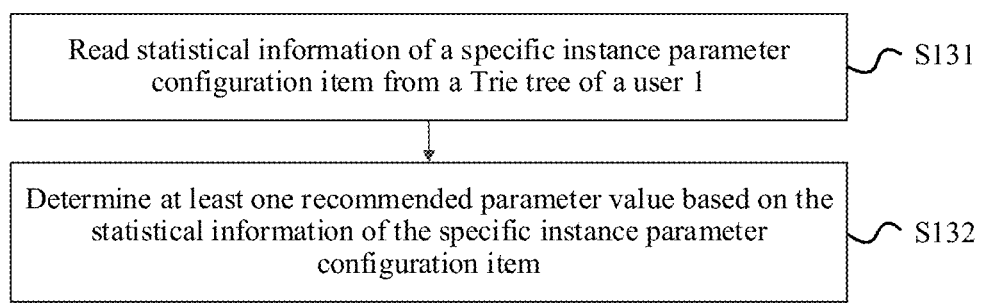
FIG. 13 is a flowchart of a method for determining a user interface by using a parameter recommendation model.

FIG. 13 is a flowchart of a method for determining a user interface by using a parameter recommendation model. The method is performed by the management device 12. In a procedure of the method, at least one recommended parameter value that is displayed to the user 1 and that corresponds to a specific instance parameter configuration item is determined based on the Trie tree of the user 1 by using the parameter recommendation model.

As shown in FIG. 13, the method includes the following steps S131 and S132.

First, in step S131, statistical information of the specific instance parameter configuration item is read from the Trie tree of the user 1.

For example, as shown in the interface 2 in FIG. 4, after the user 1 clicks on the creation option in the Lun menu, the user terminal 11 sends, to the management device 12, a request for displaying an interface for configuring a Lun instance. Therefore, the model processing unit 1214 in the management device 12 starts to run, to determine, by using the parameter recommendation model, a recommended capacity value that is of a Lun instance and that is displayed to the user 1 in the capacity input box. As described above, the capacity input box corresponds to the configuration item Lun_sz. Referring to FIG. 7, the model processing unit 1214 may query, in the Trie tree of the user 1, a node (the_sz node) corresponding to the configuration item Lun_sz, and read statistical information that is of the configuration item Lun_sz and that is stored in the node.

In step S132, the at least one recommended parameter value is determined based on the statistical information of the specific instance parameter configuration item.

For example, after obtaining the statistical information "30, 5; 20, 3; 40, 2/40" of the configuration item Lun_sz from the Trie tree in FIG. 7, the model processing unit 1214 parses the statistical information based on a predetermined data structure, so that the following meaning of the statistical information can be learned: In a plurality of Lun instance capacities entered by the user 1, 30 GB is entered five times, 20 GB is entered three times, and 40 GB is entered twice. In addition, a Lun instance capacity lately entered by the user 1 is 40 GB.

For example, the model processing unit 1214 is preset to determine three recommended capacity values. The model processing unit 1214 may sort the capacity values based on frequency of the capacity values, and obtain two capacity values, namely, 30 GB and 20 GB, ranked in the top two as recommended capacity values, where input frequency of 30 GB is higher than input frequency of 20 GB. In addition, the model processing unit 1214 may determine a recommended capacity value, namely, 40 GB, based on a Lun instance capacity value lately entered by the user 1. Then, similar to the foregoing recommended instance names, the model processing unit 1214 may sort the three determined recommended capacity values based on a predetermined rule. For example, the three recommended capacity values may be sorted as follows: 40GB>30GB>20GB. After the three sorted recommended capacity values are determined, the management device 12 may send the three sorted recommended capacity values to the user terminal 11.

In an implementation, as described above, the statistical information that is of the Lun_sz configuration item and that is obtained by using the data preprocessing unit 1212 is Lun instance capacity values arranged in a sequence of request numbers, that is, the statistical information corresponding to the_sz node in the Trie tree of the user 1 is the Lun instance capacity values arranged in the foregoing sequence. In this case, after reading the statistical information of the Lun_sz configuration item from the Trie tree, the model processing unit 1214 performs statistics collection on non-repetitive capacity values in the Lun instance capacity values and frequency of the non-repetitive capacity values by using the parameter recommendation model, so that the statistical information of the Lun_sz configuration item in the data table 3 can be obtained. Then, as described above, the at least one recommended capacity value of the Lun instance may be determined based on the newly obtained statistical information of the Lun_sz configuration item.

After the foregoing determining process is completed, the model processing unit 1214 may send the three sorted recommended Lun instance capacity values to the user terminal 11, so that the user terminal 11 can sequentially display the three recommended capacity values in a Lun instance capacity input box in the user interface, to perform recommendation for the user 1. As shown in FIG. 12, when the user terminal 11 displays the interface, "40 GB" is automatically filled in the capacity input box of the interface based on the foregoing determining result. After the user 1 points a mouse to the input box, similar to the name input box in the interface, 30 GB and 20 GB are sequentially displayed in a drop-down menu of the input box for user selection. "40 GB" displayed in FIG. 12 is or "30 GB" and "20 GB" displayed in the drop-down menu are determined based on statistical information of an object (a capacity configuration item in FIG. 12) configured by using the interface, that is, "40 GB" displayed in FIG. 12 is or "30 GB" and "20 GB" displayed in the drop-down menu are display content determined based on the configuration content "20 GB" in the interface 3 in FIG. 4, to recommend a capacity value to the user. The user terminal 11 automatically displays the three recommended capacity values in the Lun instance capacity input box, so that the user 1 can complete entering in the capacity input box by clicking on one of the three recommended capacity values, to reduce user operation time and improve user experience compared with manually filling in a capacity value by the user 1.

Figure 14:
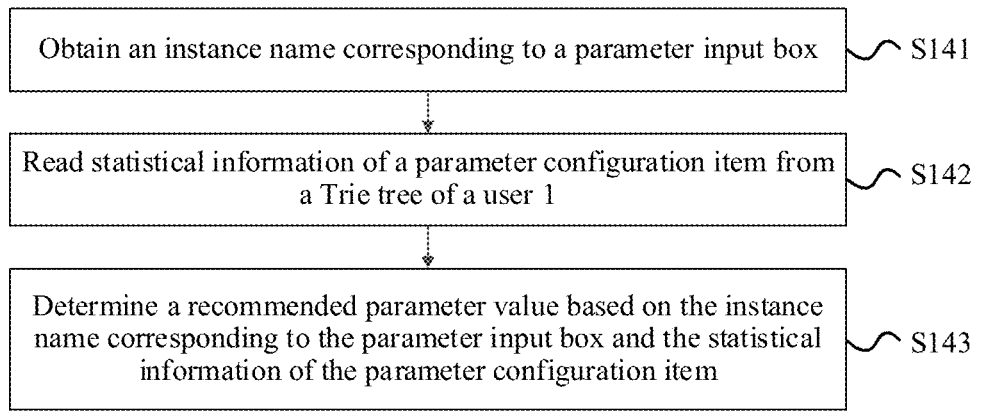
FIG. 14 is a flowchart of another method for determining a user interface by using a parameter recommendation model.

FIG. 14 is a flowchart of another method for determining a user interface by using a parameter recommendation model. The method is performed by the management device 12. In a procedure of the method, a recommended parameter value displayed to the user 1 in a parameter input box is determined based on the Trie tree of the user 1 and an instance name corresponding to the parameter input box by using the parameter recommendation model.

As shown in FIG. 14, the method includes the following steps S141 to S143.

First, in step S141, the instance name corresponding to the parameter input box is obtained.

In a case, the parameter input box is, for example, the Lun number input box in the user interface that is for creating a Lun group instance and that is shown in FIG. 5. After the user terminal 11 displays the user interface, the user 1 first enters an instance name in the Lun group name input box (or selects an instance name from at least one recommended instance name). After the user 1 enters the instance name, the user terminal 11 sends the instance name to the management device 12, so that the management device 12 can obtain the instance name entered by the user 1.

In another case, the parameter input box is, for example, a Lun number input box in an interface for modifying a Lun group instance parameter. After the user terminal 11 sends a request for modifying a parameter of a Lun instance, the management device 12 may obtain an instance name corresponding to the Lun number input box from the request.

In step S142, statistical information of a parameter configuration item is read from the Trie tree of the user 1.

For example, after the management device obtains the instance name (LG_A_01) corresponding to the Lun number input box, the model processing unit 1214 in the management device 12 starts to run, to determine, by using the parameter recommendation model, a recommended Lun number that is of a Lun group instance and that is displayed to the user 1 in the Lun number input box. As described above, the Lun number input box corresponds to the configuration item Lun_g_num. Referring to FIG. 7, the model processing unit 1214 may query, in the Trie tree of the user 1, a node (the_num node) corresponding to the configuration item Lun_g_num, and read statistical information that is of the configuration item Lun_g_num and that is stored in the node. For example, as shown in the data table 3, the statistical information is LG_A, 3, 2; 2, 1/LG_B, 3, 1.

In step S143, the recommended parameter value is determined based on the instance name corresponding to the parameter input box and the statistical information of the parameter configuration item.

For example, after obtaining the statistical information "LG_A, 3, 2; 2, 1/LG_B, 3, 1" of the configuration item Lun_g_num from the Trie tree in FIG. 7, the model processing unit 1214 parses the statistical information based on a predetermined data structure, so that the following meaning of the statistical information can be learned: In a plurality of Lun numbers that are already entered by the user 1 and that are included in a plurality of Lun group instances whose name prefixes are LG_A, "3" is entered twice, and "2" is entered once; and in a plurality of Lun numbers that are already entered by the user 1 and that are included in a plurality of Lun group instances whose name prefixes are LG_B, "3" is entered once.

That is, the statistical information of the configuration item Lun_g_num includes statistical information for different Lun group instance name prefixes. Based on the statistical information, the model processing unit 1214 may recommend a Lun number relative to a prefix included in a Lun group instance name corresponding to the Lun number input box. For example, the user 1 already enters a Lun group name LG_A_01 in the interface shown in FIG. 5. After performing word segmentation on the name, the model processing unit 1214 determines that a prefix included in the name is "LG_A". Then, the model processing unit 1214 finds, in the statistical information of Lun_g_num, statistical information, namely, "LG_A, 3, 2; 2, 1", corresponding to "LG_A", so that a Lun number (3) with highest frequency in the statistical information can be determined as a recommended Lun number.

Figure 15:
FIG. 15 is a schematic diagram of a user interface including a recommended parameter value.

FIG. 15 is a schematic diagram of a user interface including a recommended parameter value. As shown in FIG. 15, after the user 1 enters a Lun group name in the Lun group name input box, the management device may determine, as described above, a recommended Lun number based on the instance name entered by the user 1 and the statistical information of the Lun number configuration item, so that the user interface automatically displays "3" in the Lun number input box, to perform recommendation for the user. It may be understood herein that, as described above, the management device may alternatively determine at least one recommended Lun number, and display the at least one recommended Lun number in a drop-down menu of a Lun number input box.

Figure 16:
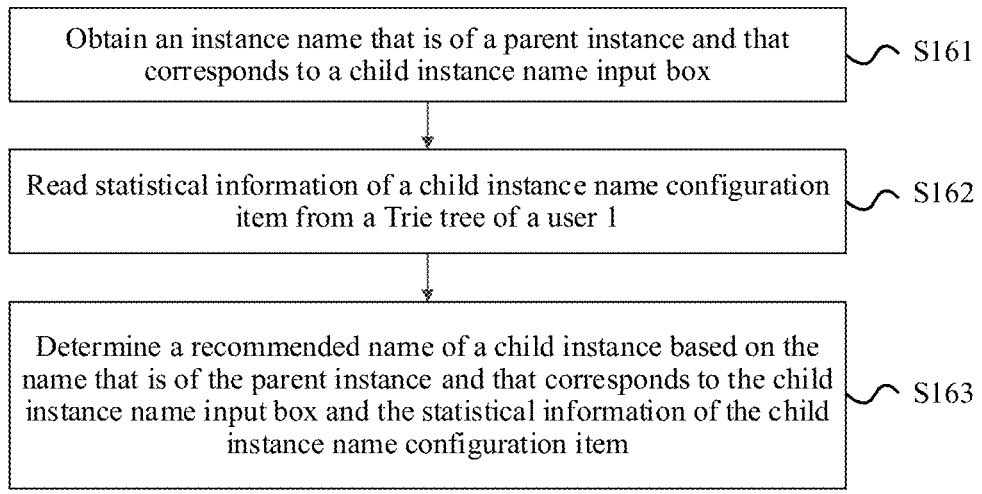
FIG. 16 is a flowchart of another method for determining a user interface by using a name recommendation model.

FIG. 16 is a flowchart of another method for determining a user interface by using a name recommendation model. The method is performed by the management device 12. In a procedure of the method, a recommended instance name displayed to the user 1 in a child instance name input box is determined based on the Trie tree of the user 1 and an instance name that is of a parent instance and that corresponds to the child instance name input box by using the name recommendation model.

As shown in FIG. 16, the method includes the following steps S161 to S163.

First, in step S161, the instance name that is of the parent instance and that corresponds to the child instance name input box is obtained.

In a case, the child instance name input box is, for example, the Lun name input box in the interface that is for creating a Lun group instance and that is shown in FIG. 5. After the user terminal 11 displays the interface, the user 1 first enters a Lun group instance name in the Lun group name input box (or selects an instance name from at least one recommended instance name). After the user 1 enters the Lun group instance name, the user terminal 11 sends the Lun group instance name to the management device 12, so that the management device 12 can obtain the Lun group instance name entered by the user 1.

In another case, the child instance name input box is, for example, a Lun name input box in an interface for modifying a Lun group instance parameter (for example, a Lun number). After the user terminal 11 sends a request for modifying a parameter of a Lun group instance, the management device 12 may obtain, from the request, a Lun group instance name corresponding to the Lun name input box.

In step S162, statistical information of a child instance name configuration item is read from the Trie tree of the user 1.

For example, after the user 1 enters a Lun group instance name in the Lun group name input box in the user interface in FIG. 5, and determines, as shown in FIG. 14, the recommended Lun number in the Lun number input box by using the model processing unit 1214, the model processing unit 1214 in the management device 12 starts to determine, by using the name recommendation model, the recommended instance name that is of the Lun instance and that is displayed to the user 1 in the Lun name input box. As described above, the Lun name input box corresponds to the configuration item Lun_g_Lunnm. Referring to FIG. 7, the model processing unit 1214 may query, in the Trie tree of the user 1, a node (the nm node) corresponding to the configuration item Lun_g_Lunnm, and read statistical information that is of the configuration item Lun_g_Lunnm and that is stored in the node. For example, as shown in the data table 3, the statistical information is LG_A, Lun_A, 6, 06; Lun_B, 2, 02/LG_B, Lun_B, 3, 03.

In step S163, the recommended instance name of the child instance is determined based on the instance name that is of the parent instance and that corresponds to the child instance name input box and the statistical information of the child instance configuration item.

For example, after obtaining the statistical information "LG_A, Lun_A, 6, 06; Lun_B, 2, 02/LG_B, Lun_B, 3, 03" of the configuration item Lun_g_Lunnm from the Trie tree in FIG. 7, the model processing unit 1214 parses the statistical information based on a predetermined data structure, so that the following meaning of the statistical information can be learned: In a plurality of Lun instance names that are already entered by the user 1 and that are included in Lun group instances whose name prefixes are LG_A, the prefix Lun_A is used six times, the prefix Lun_B is used twice, a latest suffix of the prefix Lun_A is 06, and a latest suffix of the prefix Lun_B is 02; and in a plurality of Lun instance names that are already entered by the user 1 and that are of Lun instances included in Lun group instances whose name prefixes are LG_B, the prefix Lun_B is used three times, and a latest suffix of the prefix Lun_B is 03.

That is, the statistical information of the configuration item Lun_g_Lunnm includes statistical information for different parent instance name prefixes. Based on the statistical information, the model processing unit 1214 may recommend a child Lun name relative to a prefix included in a Lun group name already entered by the user 1. For example, the user 1 already enters a Lun group name LG_A_01 in the interface shown in FIG. 5. After performing word segmentation on the name, the model processing unit 1214 determines that a prefix included in the name is "LG_A". Then, the model processing unit 1214 finds, in the statistical information of the Lun_g_Lunnm, statistical information, namely, "Lun_A, 6, 06; Lun_B, 2, 02", corresponding to "LG_A", so that a prefix (Lun_A) with highest frequency in the statistical information can be determined as a prefix of a recommended name of a Lun name; and determines a suffix (07) of the recommended name based on a latest suffix of the prefix, so that a recommended name Lun_A_07 in a Lun name input box ranked in the top in FIG. 5 can be determined. For Lun name input boxes ranked in the middle and the bottom in FIG. 5, recommended names of the Lun name input boxes may be respectively determined as Lun_A_08 and Lun_A_09 by progressively increasing the suffix of the foregoing recommended name. The user interface in FIG. 15 also displays a recommended child instance name displayed to the user. As shown in FIG. 15, after the user 1 enters a Lun group name in the Lun group name input box, the model processing unit 1214 in the management device determines a recommended Lun number as 3, and determines three recommended Lun names as Lun_A_07, Lun_A_08, and Lun_A_09, so that the recommended Lun number and the three recommended Lun names are displayed in the user interface in FIG. 15, to perform recommendation for the user.

Figure 17:
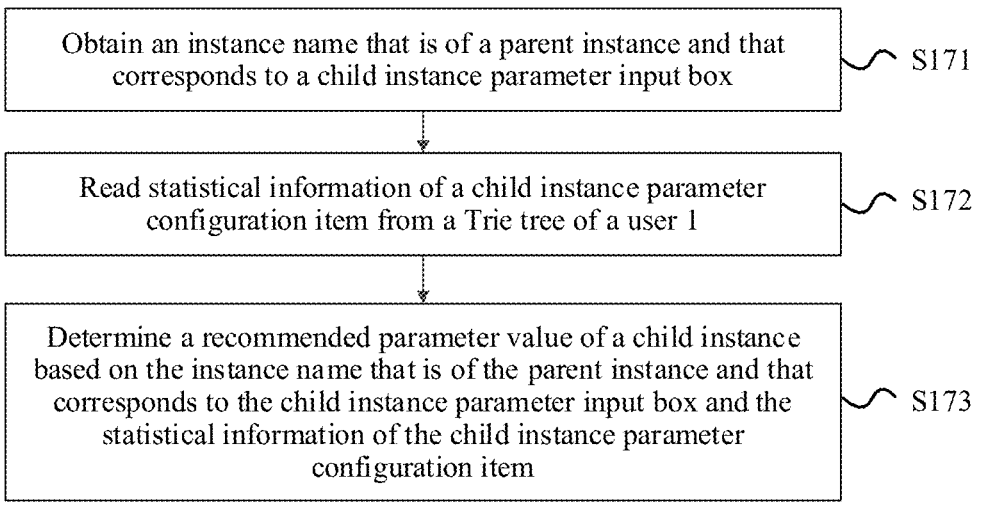
FIG. 17 is a flowchart of another method for determining a user interface by using a parameter recommendation model.

FIG. 17 is a flowchart of another method for determining a user interface by using a parameter recommendation model. The method is performed by the management device 12. In a procedure of the method, a recommended parameter value displayed to the user 1 in a child instance parameter input box is determined based on the Trie tree of the user 1 and an instance name that is of a parent instance and that corresponds to the child instance parameter input box by using the parameter recommendation model.

As shown in FIG. 17, the method includes the following steps S171 to S173.

First, in step S171, the instance name that is of the parent instance and that corresponds to the child instance parameter input box is obtained.

In a case, the child instance parameter input box is, for example, the capacity input box in the interface that is for creating a Lun group instance and that is shown in FIG. 5. After the user terminal 11 displays the interface, the user 1 first enters a Lun group instance name in the Lun group name input box (or selects an instance name from at least one recommended instance name). After the user 1 enters the Lun group instance name, the user terminal 11 sends the Lun group instance name to the management device 12, so that the management device 12 can obtain the Lun group instance name entered by the user 1.

In another case, the child instance parameter input box is, for example, a capacity input box in an interface for modifying a Lun group instance parameter (for example, a Lun number). After the user terminal 11 sends a request for modifying a parameter of a Lun group instance, the management device 12 may obtain a Lun group instance name corresponding to the Lun name input box from the request.

In step S172, statistical information of a child instance parameter configuration item is read from the Trie tree of the user 1.

For example, the capacity input box corresponds to the configuration item Lun_g_Lunsz. For example, after the user 1 enters a Lun group name in the Lun group name input box in the interface in FIG. 5, and determines, as described above, the recommended Lun number of the Lun number input box by using the model processing unit 1214, referring to FIG. 7, the model processing unit 1214 may query, in the Trie tree of the user 1, a node (the sz node) corresponding to the configuration item Lun_g_Lunsz, and read statistical information that is of the configuration item Lun_g_Lunsz and that is stored in the node. For example, as shown in the data table 3, the statistical information is LG_A, 30, 6; 20, 2; 40, 1/LG_B, 20, 2; 30, 1.

In step S173, the recommended parameter value of the child instance is determined based on the instance name that is of the parent instance and that corresponds to the child instance parameter input box and the statistical information of the child instance parameter configuration item.

For example, after obtaining the statistical information "LG_A, 30, 6; 20, 2; 40, 1/LG_B, 20, 2; 30, 1" of the configuration item Lun_g_Lunsz from the Trie tree in FIG. 7, the model processing unit 1214 parses the statistical information based on a predetermined data structure, so that the following meaning of the statistical information can be learned: In a plurality of Lun instance capacity values that are already entered by the user 1 and that are included in Lun group instances whose name prefixes are LG_A, 30 GB is entered six times, 20 GB is entered twice, and 40 GB is entered once; and in a plurality of Lun instance capacity values that are already entered by the user 1 and that are included in Lun group instances whose name prefixes are LG_B, 20 GB is entered twice, and 30 GB is entered once.

That is, the statistical information of the configuration item Lun_g_Lunsz includes statistical information for different parent instance name prefixes. Based on the statistical information, the model processing unit 1214 may recommend a child Lun instance capacity value relative to a prefix included in a Lun group name already entered by the user 1. For example, the user 1 already enters a Lun group name LG_A_01 in the interface shown in FIG. 5. After performing word segmentation on the name, the model processing unit 1214 determines that a prefix included in the name is "LG_A". Then, the model processing unit 1214 finds, in the statistical information of Lun_g_Lunsz, statistical information, namely, "30, 6; 20, 2; 40, 1", corresponding to "LG_A", so that a capacity value (30 GB) with highest frequency in the statistical information can be determined as a recommended capacity value of the three Lun instances in FIG. 5.

Figure 18:
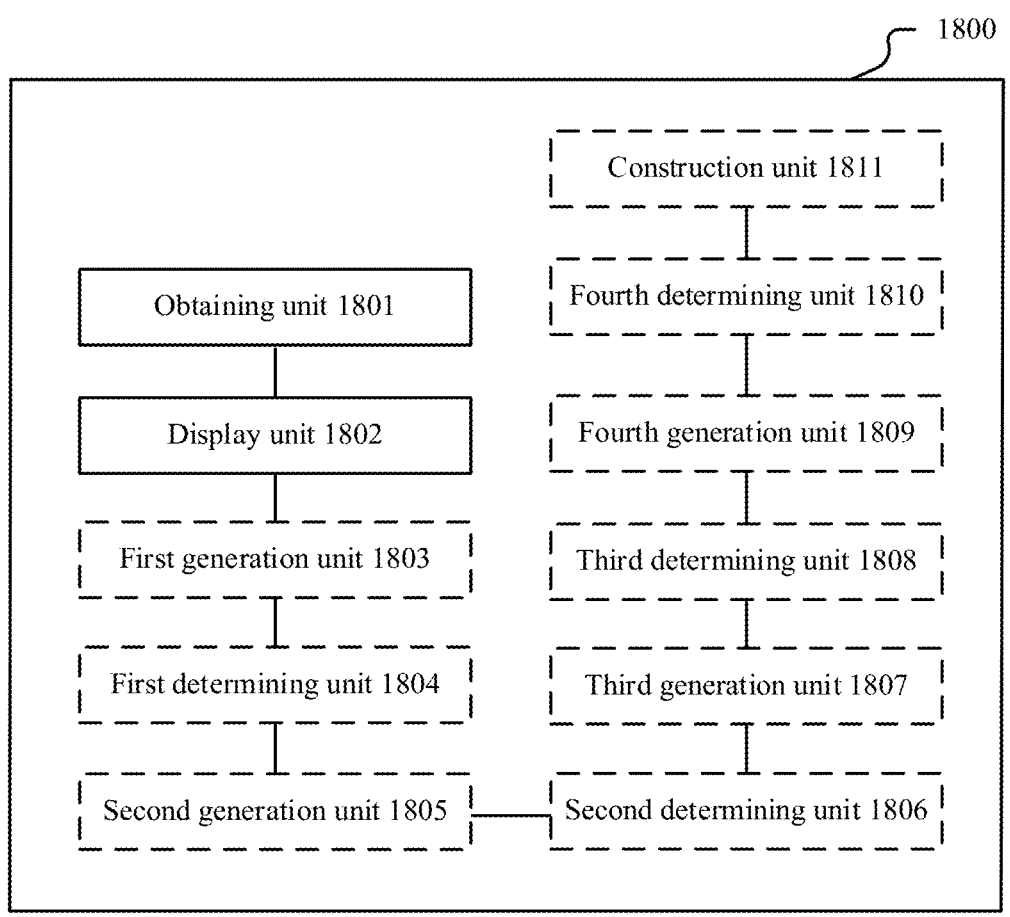
FIG. 18 shows an apparatus 1800 for displaying a user interface used to manage a storage device according to an embodiment of this application.

FIG. 18 shows an apparatus 1800 for displaying a user interface used to manage a storage device according to an embodiment of this application. The apparatus is deployed in a management device managing the storage device, and the apparatus 1800 includes:

an obtaining unit 1801, configured to obtain, by using configuration content displayed in a first user interface, configuration data of a storage device configured for a first user; and a display unit 1802, configured to: after the first user logs in to the management device, display a second user interface corresponding to the first user, where the second user interface displays display content determined based on the configuration data.

In an implementation, the configuration content is used to configure a first object, and the obtaining unit 1801 is further configured to: obtain the configuration content of the first user interface, and store the configuration content in historical configuration data of the first object; and the apparatus 1800 further includes: a first generation unit 1803, configured to perform statistics collection for the first object based on the historical configuration data, to generate statistical information of the first object; and a first determining unit 1804, configured to determine, based on the statistical information of the first object, the display content displayed in the second user interface.

In an implementation, the configuration content is a name of an object configured by using the configuration content, and the display content is a default name or a recommended name that is of the object and that is determined based on the configuration content.

In an implementation, the obtaining unit 1801 is further configured to: obtain the name of the object configured by using the configuration content, and store the name of the object in historical configuration data; and the apparatus 1800 further includes: a second generation unit 1805, configured to perform statistics collection on the name of the object configured by using the configuration content, to generate statistical information of the name of the object configured by using the configuration content; and a second determining unit 1806, configured to determine the default name or the recommended name of the object based on the statistical information of the name of the object configured by using the configuration content.

In an implementation, the configuration content is a parameter value of an object configured by using the configuration content, and the display content is a default parameter value or a recommended parameter value that is of the object and that is determined based on the configuration content.

In an implementation, the obtaining unit 1801 is further configured to: obtain the parameter value of the object configured by using the configuration content, and store the parameter value of the object in historical configuration data; and the apparatus 1800 further includes: a third generation unit 1807, configured to perform statistics collection on the parameter value of the object configured by using the configuration content, to generate statistical information of the parameter value of the object configured by using the configuration content; and a third determining unit 1808, configured to determine the default parameter value or the recommended parameter value of the object based on the statistical information of the parameter value of the object configured by using the configuration content.

In an implementation, the configuration content is a first menu displayed in the first user interface, and the display content is a second menu that is determined based on the configuration content and that is displayed in the second user interface.

In an implementation, the obtaining unit 1801 is further configured to: obtain access information of the first menu, and store the access information in historical configuration data; and the apparatus further includes: a fourth generation unit 1809, configured to perform statistics collection on historical access frequency of the first menu, to generate statistical information of the historical access frequency of the first menu; and a fourth determining unit 1810, configured to determine, based on the statistical information of the historical access frequency of the first menu, the second menu displayed in the second user interface.

In an implementation, the apparatus 1800 further includes: a construction unit 1811, configured to: after the statistical information of the first object is generated, construct a statistical information tree of the first user based on the statistical information, where the statistical information tree includes a node corresponding to the first object, and the statistical information of the first object is stored in the node.

Another aspect of this application provides a computer-readable storage medium. A computer program is or instructions are stored in the computer-readable storage medium, and when the computer program is or the instructions are executed in a computer, the computer is enabled to perform any one of the foregoing methods.

Another aspect of this application provides a computing device, including a memory and a processor. A computer program is or instructions are stored in the memory, and the processor is configured to implement any one of the foregoing methods when executing the computer program or the instructions.

It should be understood that the descriptions such as "first" and "second" in this specification are merely intended to distinguish between similar concepts for simple description, but do not have another limitation.

A person of ordinary skill in the art may be further aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraints of the technical solutions. A person skilled in the art may use different methods to implement the described functions for each particular application, but it should not be considered that the implementation goes beyond the scope of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   displaying, by a management device managing a storage device, a first user interface in a first session;
   obtaining, by the management device, using configuration content displayed in the first user interface, configuration data of the storage device configured for a first user, wherein the configuration content comprises a name of an object configured by using the configuration content in the first user interface, wherein the configuration content comprises a parameter value of the object configured by using the configuration content, wherein the configuration content indicates the object for configuring a first resource instance of the storage device, and wherein the first resource instance includes a logical unit number (LUN) instance and one of a LUN Group instance, a disk domain instance, or a host instance, wherein the configuration content comprises a first menu displayed in the first user interface, and wherein the obtaining the configuration data comprises:
   obtaining access information of the first menu, and storing the access information in historical configuration data:
   obtaining, by the management device, the name of the object configured by using the configuration content, and storing the name of the object in the historical configuration data, and
   obtaining, by the management device, the parameter value of the object configured by using the configuration content, and storing the parameter value of the object in the historical configuration data;
   performing, by the management device, statistics collection on historical access frequency of the first menu, to generate statistical information of the historical access frequency of the first menu:
   determining, by the management device, based on the statistical information of the historical access frequency of the first menu, a second menu displayed in a second user interface;
   performing, by the management device, statistics collection on the name of the object configured by using the configuration content to generate statistical information of the name of the object configured by using the configuration content;
   determining, by the management device, a recommended name of the object based on the statistical information of the name of the object configured by using the configuration content, the recommended name including at least one of a prefix or a suffix;
   performing, by the management device, statistics collection on the parameter value of the object configured by using the configuration content to generate statistical information of the parameter value of the object configured by using the configuration content;
   determining, by the management device, a recommended parameter value of the object based on the statistical information of the parameter value of the object configured by using the configuration content, the recommended parameter value including a storage size; and
   after the first user logs into the management device in a second session and after the displaying the first user interface, displaying, by the management device, the second user interface corresponding to the first user, wherein the second user interface displays display content determined based on the configuration data, wherein the display content comprises the second menu, the recommended name of the object, and the recommended parameter value of the object, and wherein selecting the second menu causes displaying of the recommended name of the object, and the recommended parameter value of the object.

2. The method according to claim 1, wherein the configuration content configures the object, wherein the obtaining the configuration data comprises:
   obtaining, by the management device, the configuration content of the first user interface, and storing the configuration content in historical configuration data of the object, and

37 wherein the method further comprises:
performing, by the management device, statistics collection for the object based on the historical configuration data of the object to generate statistical information of the object; and
determining, by the management device, based on the statistical information of the object, the display content displayed in the second user interface.

3. The method according to claim 2, further comprising:
after the statistical information of the object is generated, constructing, by the management device, a statistical information tree of the first user based on the statistical information, wherein the statistical information tree comprises a node corresponding to the object, and the statistical information of the object is stored in the node.

4. A computing device, comprising:
at least one processor; and
a computer readable storage medium storing programming, the programming including instructions that, when executed by the at least one processor, cause the computing device to perform operations including:
displaying a first user interface in a first session;
obtaining, by using configuration content displayed in the first user interface, configuration data of a storage device configured for a first user, wherein the configuration content comprises a name of an object configured by using the configuration content in the first user interface, wherein the configuration content comprises a parameter value of the object configured by using the configuration content, wherein the configuration content indicates the object for configuring a first resource instance of the storage device, and wherein the first resource instance includes a logical unit number (LUN) instance and one of a LUN Group instance, a disk domain instance, or a host instance, wherein the configuration content comprises a first menu displayed in the first user interface, and wherein the obtaining the configuration data comprises:
obtaining access information of the first menu, and storing the access information in historical configuration data;
obtaining the name of the object configured by using the configuration content, and storing the name of the object in the historical configuration data, and
obtaining the parameter value of the object configured by using the configuration content, and storing the parameter value of the object in the historical configuration data;
performing statistics collection on historical access frequency of the first menu, to generate statistical information of the historical access frequency of the first menu;
determining based on the statistical information of the historical access frequency of the first menu, a second menu displayed in a second user interface;
performing statistics collection on the name of the object configured by using the configuration content to generate statistical information of the name of the object configured by using the configuration content;
determining a recommended name of the object based on the statistical information of the name of the object configured by using the configuration content, the recommended name including at least one of a prefix or a suffix;
performing statistics collection on the parameter value of the object configured by using the configuration content to generate statistical information of the parameter value of the object configured by using the configuration content;
determining a recommended parameter value of the object based on the statistical information of the parameter value of the object configured by using the configuration content, the recommended parameter value including a storage size; and
after the first user logs in to the computing device in a second session and after the displaying the first user interface, displaying the second user interface corresponding to the first user, wherein the second user interfaced displays display content determined based on the configuration data, wherein the display content comprises the second menu, the recommended name of the object, and the recommended parameter value of the object, and wherein selecting the second menu causes displaying of the recommended name of the object, and the recommended parameter value of the object.

5. The computing device according to claim 4, wherein the configuration content configures the object, and wherein the obtaining the configuration data comprises:
obtaining the configuration content of the first user interface, and storing the configuration content in historical configuration data of the object, and
wherein the operations further comprise:
performing statistics collection for the object based on the historical configuration data of the object, to generate statistical information of the object; and
determining, based on the statistical information of the object, the display content displayed in the second user interface.

6. The computing device according to claim 5, the operations further comprising:
after the statistical information of the object is generated, constructing a statistical information tree of the first user based on the statistical information, wherein the statistical information tree comprises a node corresponding to the object, and the statistical information of the object is stored in the node.

7. A non-transitory computer-readable storage medium having instructions stored thereon that, when executed by a computer, cause the computer to perform operations, the operations comprising:
displaying a first user interface in a first session;
obtaining, by using configuration content displayed in the first user interface, configuration data of a storage device configured for a first user, wherein the configuration content comprises a name of an object configured by using the configuration content in the first user interface, wherein the configuration content comprises a parameter value of the object configured by using the configuration content, wherein the configuration content indicates the object for configuring a first resource instance of the storage device, and wherein the first resource instance includes a logical unit number (LUN) instance and one of a LUN Group instance, a disk domain instance, or a host instance, wherein the configuration content comprises a first menu displayed in the first user interface, and wherein the obtaining the configuration data comprises:
obtaining access information of the first menu, and storing the access information in historical configuration data;

obtaining the name of the object configured by using the configuration content, and storing the name of the object in the historical configuration data, and obtaining the parameter value of the object configured by using the configuration content, and storing the parameter value of the object in the historical configuration data;

performing statistics collection on historical access frequency of the first menu, to generate statistical information of the historical access frequency of the first menu:

determining based on the statistical information of the historical access frequency of the first menu, a second menu displayed in a second user interface;

performing statistics collection on the name of the object configured by using the configuration content to generate statistical information of the name of the object configured by using the configuration content;

determining a recommended name of the object based on the statistical information of the name of the object configured busing the configuration content, the recommended name including at least one of a prefix or a suffix;

performing statistics collection on the parameter value of the object configured by using the configuration content to generate statistical information of the parameter value of the object configured by using the configuration content;

determining a recommended parameter value of the object based on the statistical information of the parameter value of the object configured by using the configuration content, the recommended parameter value including a storage size; and after the first user logs into the computer in a second session and after the displaying the first user interface, displaying the second user interface corresponding to the first user, wherein the second user interface displays display content determined based on the configuration data, wherein the display content comprises the second menu, the recommended name of the object, and the recommended parameter value of the object, and wherein selecting the second menu causes displaying of the recommended name of the object, and the recommended parameter value of the object.

8. The non-transitory computer-readable storage medium according to claim 7, wherein the configuration content configures the object, and wherein the obtaining the configuration data comprises:

obtaining the configuration content of the first user interface, and storing the configuration content in historical configuration data of the object, and wherein the operations further comprise:

performing statistics collection for the object based on the historical configuration data of the object to generate statistical information of the object; and determining, based on the statistical information of the object, the display content displayed in the second user interface.

9. The non-transitory computer-readable storage medium according to claim 7, the operations further comprising:

after the statistical information of the object is generated, constructing a statistical information tree of the first user based on the statistical information, wherein the statistical information tree comprises a no de corresponding to the object, and the statistical information of the object is stored in the node.

* * * * *

UNITED STATES PATENT AND TRADEMARK OFFICE
CERTIFICATE OF CORRECTION

PATENT NO. : 12,166,646 B2
APPLICATION NO. : 17/993356
DATED : December 10, 2024
INVENTOR(S) : Ning et al.

Page 1 of 1

It is certified that error appears in the above-identified patent and that said Letters Patent is hereby corrected as shown below:

In the Claims

In Column 36, in Claim 1, Line 12, delete "data:" and insert -- data; --.

In Column 36, in Claim 1, Line 24, delete "menu:" and insert -- menu; --.

In Column 36, in Claim 1, Line 49, delete "into" and insert -- in to --.

In Column 37, in Claim 4, Line 42, delete "data:" and insert -- data; --.

In Column 37, in Claim 4, Line 53, delete "menu:" and insert -- menu; --.

In Column 37, in Claim 4, Line 56, delete "interface:" and insert -- interface; --.

In Column 38, in Claim 4, Line 14, delete "interfaced" and insert -- interface --.

In Column 38, in Claim 7, Line 67, delete "data:" and insert -- data; --.

In Column 39, in Claim 7, Line 11, delete "menu:" and insert -- menu; --.

In Column 39, in Claim 7, Line 22, delete "busing" and insert -- by using --.

In Column 40, in Claim 7, Line 1, delete "into" and insert -- in to --.

In Column 40, in Claim 9, Line 31, delete "no de" and insert -- node --.

Signed and Sealed this
Twenty-eighth Day of January, 2025

Coke Morgan Stewart
*Acting Director of the United States Patent and Trademark Office*